(12) United States Patent  (10) Patent No.: US 8,062,084 B2
Konakawa et al.  (45) Date of Patent: Nov. 22, 2011

(54) OUTBOARD MOTOR

(75) Inventors: Tsugunori Konakawa, Shizuoka (JP); Yusuke Takahashi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 281 days.

(21) Appl. No.: 12/494,588

(22) Filed: Jun. 30, 2009

(65) Prior Publication Data

US 2010/0003873 A1   Jan. 7, 2010

(30) Foreign Application Priority Data

Jul. 2, 2008  (JP) ................... 2008-173153
Jul. 8, 2008  (JP) ................... 2008-177633

(51) Int. Cl.
*B63H 21/00*  (2006.01)
(52) U.S. Cl. ..................................................... 440/89 R
(58) Field of Classification Search ............... 440/88 R, 440/89 R, 89 G, 89 J; 60/299, 323
See application file for complete search history.

(56) References Cited

U.S. PATENT DOCUMENTS

| 6,045,421 | A | 4/2000 | Hiraoka et al. | |
| 7,930,883 | B2 * | 4/2011 | Konakawa et al. | 60/323 |
| 2002/0146947 | A1 | 10/2002 | Ishii | |
| 2008/0022669 | A1 * | 1/2008 | Konakawa et al. | 60/299 |
| 2009/0007550 | A1 | 1/2009 | Konakawa et al. | |

* cited by examiner

*Primary Examiner* — Daniel Venne
(74) *Attorney, Agent, or Firm* — Keating & Bennett, LLP

(57) ABSTRACT

An outboard motor includes an engine and an exhaust pipe. The engine has a crank case, a cylinder body, and a cylinder head aligned along the front-rear direction of the outboard motor, and arranged to support a crankshaft so as to extend along an up-down direction. The exhaust pipe is arranged to lead an exhaust gas of the engine to a main exhaust passage positioned below the engine. The cylinder head has an exhaust gas outlet opened in the side portion on one side of the cylinder head in the left-right direction of the outboard motor. The exhaust pipe has a bypass exhaust pipe which, in a plan view, extends from the exhaust gas outlet, bypasses the engine along the crank case, and reaches the other side in the left-right direction of the engine.

19 Claims, 26 Drawing Sheets

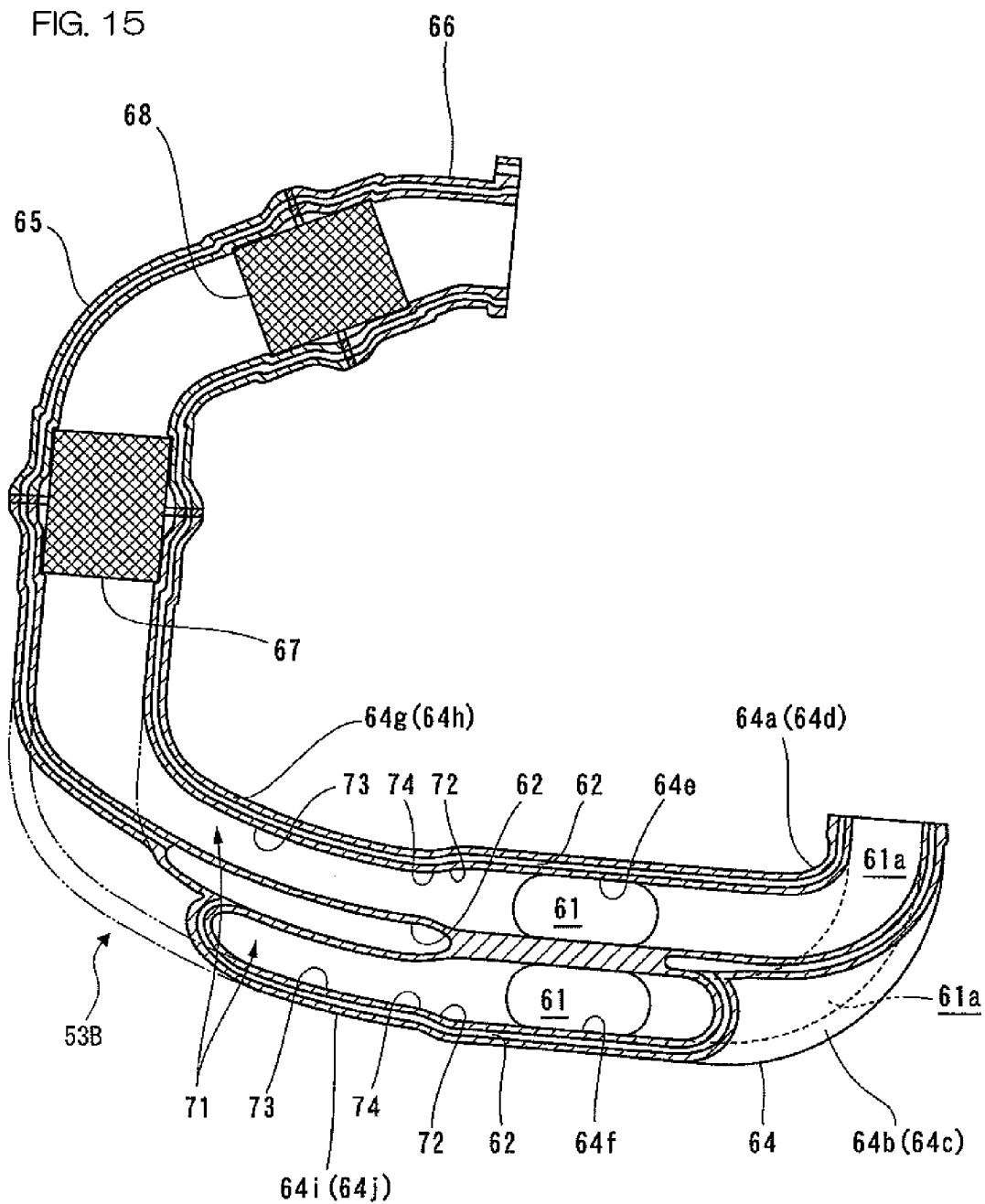

OUTBOARD MOTOR

BACKGROUND OF THE INVENTION

1. Field of the Invention

The present invention relates to an outboard motor which includes an engine and an exhaust pipe for leading an exhaust gas of the engine to a main exhaust passage arranged below the engine.

2. Description of Related Art

An outboard motor according to one prior art is disclosed in U.S. Patent Application Publication No. US 2008/0022669 A1. This outboard motor includes an engine which supports a crankshaft in a posture along the up-down direction, a casing positioned below the engine, and an engine cover surrounding the engine. The engine is a multi-cylinder engine. This outboard motor further includes an exhaust pipe which connects the engine and a main exhaust passage inside the casing to prevent exhaust interference among cylinders of the engine.

The engine is a V-shaped 6-cylinder engine having two cylinder rows which form a V shape in a plan view. Therefore, this engine includes two cylinder heads. In the side walls opposing each other of these two cylinder heads, exhaust outlets are formed, respectively.

The lower end of the crankshaft is connected to a drive shaft. The drive shaft is housed in the casing while being in a posture along the up-down direction. The lower end of the drive shaft is coupled to a propeller supported rotatably on the lower end of the casing.

Inside the casing, the main exhaust passage is formed so as to penetrate the inside of the casing in the up-down direction. The inlet end of the main exhaust passage is connected to exhaust outlets of the cylinder heads via an exhaust pipe. In addition, the outlet end of the main exhaust passage is opened inside water at the shaft center of the propeller.

The exhaust pipe consists of a tubular part forming exhaust passages of the respective cylinders and an exhaust chamber which collects the exhaust passages of the cylinders in one passage, and is housed in a rear part of the engine cover. The tubular part includes an exhaust manifold part positioned between the two cylinder heads. The tubular part includes a first horizontal part reaching the end on the right side of the outboard motor inside the engine cover from the exhaust manifold part. The tubular part further includes a second horizontal part reaching the end on the left side of the outboard motor through the rear end inside the engine cover from the tip end of the first horizontal part.

The second horizontal part is formed into an L shape in a plan view, and is arranged such that the corner at the bent portion is directed to the rear of the outboard motor. On the upstream side and the downstream side of the corner of the second horizontal part, catalysts are respectively provided.

The exhaust chamber is formed so as to extend in the up-down direction along the engine. To the upper end of the exhaust chamber, the tip end of the second horizontal part is connected. The inlet end of the main exhaust passage is connected to the lower end of the exhaust chamber.

The exhaust pipe of the outboard motor of the above-described prior art is formed so as to extend from the outboard motor right side to the outboard motor left side in a narrow space between the rear end of the engine and the rear inner wall surface of the engine cover. An exhaust gas flowing inside the exhaust pipe changes its direction from the engine to the outboard motor right side, and then changes its direction to the outboard motor left side. Therefore, the exhaust resistance is great, and there is a limit to improving the output of the outboard motor.

SUMMARY OF THE INVENTION

In order to overcome the problems described above, preferred embodiments of the present invention provide an outboard motor including an engine which has a crank case, a cylinder body, and a cylinder head aligned along the front-rear direction of the outboard motor, and supporting a crankshaft arranged to extend in an up-down direction, and an exhaust pipe arranged to lead an exhaust gas of the engine to a main exhaust passage positioned below the engine. The cylinder head has an exhaust gas outlet opened on one outside surface thereof in the left-right direction of the outboard motor, and the exhaust pipe has a bypass exhaust pipe which, in a plan view, extends from the exhaust gas outlet, bypasses the engine along the crank case, and reaches the other side in the left-right direction of the engine. In other words, the bypass exhaust pipe extends horizontally from the exhaust gas outlet opened in the side portion of the cylinder head and bypasses the engine along the crank case in a plan view so as to extend from one side to the other side of the engine. "Extends horizontally" in this case means not only extension along the horizontal plane but also extension diagonally to the horizontal plane.

With the above configuration, an exhaust gas discharged from the cylinder head can be made to flow so as to whirl in one direction around the engine in a plan view. Therefore, the exhaust resistance can be made smaller than in the prior art in which the exhaust gas flows while changing its direction to left and right. As a result, the output of an outboard motor can be further improved.

The crank case may be arranged ahead of the cylinder body. In this case, the bypass exhaust pipe extends through the front of the crank case in a plan view.

In one preferred embodiment, the outboard motor further includes an exhaust chamber which is arranged on the other side in the left-right direction of the engine and connected to the main exhaust passage, and the outlet end of the bypass exhaust pipe is connected to the exhaust chamber.

In a preferred embodiment, the cylinder head is arranged at the rear of the outboard motor on the opposite side of the crank case with respect to the front-rear direction of the outboard motor. In this case, a head cover may be attached to the rear portion of the cylinder head. Further, an intake surge tank may be arranged at the rear of the head cover.

In this configuration, preferably, the cylinder head has an intake port formed on the opposite side of the exhaust gas outlet in the left-right direction of the outboard motor, and the intake surge tank is arranged to communicate with the intake port via an intake pipe extending while curving in the width direction of the outboard motor.

Further, preferably, the intake pipe curves toward the other side in the left-right direction of the outboard motor. Accordingly, the intake passage on the downstream side of the intake surge tank and the exhaust pipe form substantially an S shape in a plan view. "S shape" includes a reversed S shape as well as an S shape. In other words, the intake passage on the downstream side of the intake surge tank and the exhaust pipe may form a substantially S shape in a plan view or form a substantially S shape in a bottom view.

In a preferred embodiment of the present invention, a catalyst is preferably arranged in the bypass exhaust pipe.

In this case, a nozzle may be arranged on the upstream side of the catalyst in the bypass exhaust pipe. The nozzle may preferably have a narrowing portion at which the cross section area of the exhaust passage thereof is gradually reduced toward the downstream side, and an expanding portion at which the cross section area of the exhaust passage gradually increases toward the downstream side between the narrowing portion and the catalyst. In this case, at the boundary between the narrowing portion and the expanding portion, a throat portion is formed. In a preferred embodiment, the nozzle preferably is a supersonic nozzle. In the supersonic nozzle, when the ratio of the pressure of the upstream of the narrowing portion and the pressure of the downstream of the expanding portion becomes less than a critical pressure ratio, the exhaust gas flow rate at the throat portion reaches the sonic speed, and the exhaust gas is accelerated to a supersonic speed at the expanding portion.

In a preferred embodiment, an air introducing passage is connected to the upstream side of the catalyst arranged in the bypass exhaust pipe. Into the air introducing passage, air which has not passed through the inside of the cylinders of the engine is introduced. Such air may be referred to as "secondary air" in this specification.

In a preferred embodiment, the exhaust pipe further includes an exhaust chamber coupled to the outlet end of the bypass exhaust pipe. The interior of the exhaust chamber may be partitioned into an upstream exhaust gas chamber and a downstream exhaust gas chamber by a partition. Further, preferably, in the partition, a communicating hole which makes communication between both the upstream and downstream exhaust gas chambers is provided, and an on-off valve which opens and closes the communicating hole is provided.

In a preferred embodiment, the engine preferably is a multi-cylinder engine having a plurality of cylinders. In this case, the cylinder head has a plurality of exhaust gas outlets corresponding to the plurality of cylinders, respectively. In addition, the bypass exhaust pipe has a plurality of exhaust passages which are connected to the plurality of exhaust gas outlets, respectively, and separated from each other. Preferably, the plurality of exhaust passages are separated from each other in the range from the exhaust outlets to at least portions at the other side in the left-right direction of the engine.

With this configuration, the exhaust passages connected to the exhaust gas outlets of the respective cylinders can be formed long separately. As a result, the pressure inside the exhaust passages can be lowered for the following two reasons. Accordingly, the amount of exhaust gas remaining in the cylinders due to internal EGR (Exhaust Gas Recirculation) can be reduced.

(1) First Reason

When the exhaust valve opens at the time of operation of the engine, an exhaust gas with a high pressure inside the cylinder passes through the gap between the valve body of the exhaust valve and the valve seat on the cylinder head side and blows out to the exhaust port. It is known that the flow rate of the exhaust gas flowing in the gap reaches sonic speed even when the engine speed is approximately 2000 rpm. When the flow rate of the exhaust gas flowing in the gap reaches the sonic speed, and the exhaust gas then flows into the exhaust port with a relatively large passage cross section area, a shock wave is generated in the exhaust port. This shock wave advances toward the downstream side inside the exhaust passage.

Inside the exhaust passage in which the shock wave has been thus generated, an expansion wave which advances oppositely to the shock wave is also generated. The pressure between the expansion wave and the shock wave becomes a negative pressure. Therefore, by forming the exhaust passage connected to the exhaust gas outlet to be sufficiently long, the time during which the shock wave and the expansion wave are allowed to exist inside the exhaust passage becomes longer, and a high negative pressure is generated inside the exhaust passage.

(2) Second Reason

The pressure inside the exhaust passage gradually rises from the upstream side toward the downstream side according to discharge of the exhaust gas from the exhaust port. When exhaust passages of a plurality of cylinders are collected at the downstream side, the pressure is also transmitted to the exhaust passages of other cylinders via the collecting portion of the exhaust passages. Therefore, by forming the lengths of the exhaust passages connected to the exhaust gas outlets to be long, the time until the pressure reaches the exhaust ports of other cylinders can be lengthened.

For example, it is assumed that the engine has a first cylinder and a second cylinder whose ignition timings are close to each other, and that the first cylinder is ignited earlier than the second cylinder. A case is assumed that when an exhaust valve in a first cylinder is open, an exhaust gas is discharged to the exhaust passage of the second cylinder. In this case, when the length of the exhaust passage is long, the time until the pressure of the exhaust gas in the second cylinder is transmitted to the exhaust port of the first cylinder via the exhaust passage becomes longer. Therefore, when the exhaust valve is open in the first cylinder, exhaust interference is not received by the exhaust gas of the second cylinder, and discharge of the exhaust gas in the first cylinder can be prevented from being obstructed by the exhaust interference.

Thus, the exhaust pressure inside the exhaust passage can be lowered during the exhaust stroke, and the exhaust gas can be smoothly discharged from the inside of the cylinder into the exhaust passage. As a result, the amount of the exhaust gas remaining inside the cylinders due to internal EGR is reduced. Accordingly, the temperature of intake gas suctioned into the cylinder during the intake stroke becomes relatively low, so that an occurrence of abnormal combustion such as self-ignition and knocking can be reliably prevented. Self-ignition is a phenomenon in which an air fuel mixture naturally ignites before ignition by the ignition plug.

If the self-ignition phenomenon occurs, the output lowers. Further, if knocking frequently occurs with the engine, a shock wave generated inside the combustion chamber along with knocking breaks the gas film (boundary layer) on the surface inside the cylinder.

If this gas film is broken, the flame from combustion comes into direct contact with the metal surfaces inside the cylinder (cylinder inner peripheral surface, piston top surface, and cylinder head surface, etc.). These metal surfaces are easily melted by heat when they are directly exposed to flame. If these metal surfaces are melted, this finally results in breakage of the engine.

If the ignition timing of the engine is delayed to prevent the occurrence of knocking, the torque of the engine lowers. Further, the temperature of the exhaust gas rises. Therefore, when a catalyst is arranged in the exhaust passage, the temperature of the catalyst may excessively rise. It is known that the catalyst is deteriorated by a so-called sintering phenomenon if it is continuously exposed to an excessively high temperature, and the purifying efficiency is deteriorated. This sintering phenomenon is a phenomenon in which the catalyst is held at a high temperature not less than 850° C. for a long period and noble metals in the catalyst thermally adhere to each other and reduce the surface area of the noble metals.

If the pressure inside the exhaust passage is high, in each cylinder, the exhaust gas is difficult to discharge into the exhaust passage during the exhaust stroke, and the amount of the exhaust gas remaining in the cylinder increases. At this time, inside the cylinder, a large amount of exhaust gas has been introduced due to internal EGR. Then, while the high-temperature exhaust gas remains inside the cylinder, new air is suctioned into the cylinder during the intake stroke. This new air (intake gas) is mixed with the high-temperature exhaust gas inside the cylinder, and as a result, the temperature of the intake gas rises due to the heat of the exhaust gas. Thus, the temperature of the intake gas inside the cylinder becomes excessively high, so that abnormal combustion such as self-ignition and knocking easily occurs.

Therefore, as described above, by making longer the exhaust passage of each cylinder, the exhaust pressure inside the exhaust passage can be lowered during the exhaust stroke, and the exhaust gas can be smoothly discharged from the inside of the cylinder into the exhaust passage. As a result, internal EGR can be suppressed, so that an occurrence of abnormal combustion such as self-ignition and knocking can be reliably prevented.

In a preferred embodiment, the plurality of exhaust passages may be arranged along horizontal planes at the heights of the corresponding exhaust gas outlets.

The plurality of exhaust gas outlets may be disposed at different heights, and the plurality of exhaust passages may be disposed at different heights corresponding to the heights of the plurality of exhaust gas outlets. In other words, the exhaust passages of the cylinders may be arranged according to the order of height of the exhaust gas outlets of the plurality of cylinders.

In a preferred embodiment, on the other side in the left-right direction of the engine, an exhaust chamber connected to the main exhaust passage is arranged. The outlet ends of the plurality of exhaust passages are connected commonly to the exhaust chamber. In this case, preferably, the plurality of exhaust passages are separated from each other from the exhaust gas outlets to the exhaust chamber.

In a preferred embodiment, the bypass exhaust pipe preferably includes a tubular member formed by integrally molding a plurality of tubular portions corresponding to the plurality of exhaust passages.

In this case, the plurality of tubular portions may be formed such that the interval between the tubular portions adjacent to each other becomes narrowest at the central portion between the inlet end and the outlet end of the tubular member.

Catalysts may be arranged in the plurality of exhaust passages, respectively.

In this case, preferably, a plurality of air introducing passages respectively connected to the upstream sides of the catalysts in the plurality of exhaust passages are further provided.

An outboard motor of a preferred embodiment includes an engine cover covering the engine, and an intake duct arranged to lead air inside the engine cover to an intake port of the engine. In the engine cover, an air inlet is formed. In this case, each of the air introducing passages may have one upstream side introducing portion led out from the intake duct, and downstream side introducing portions which are branched from the upstream side introduction portion via check valves for respective cylinders. Each of the downstream side introducing portions has a downstream end connected to the exhaust passage of corresponding cylinder.

In addition, the plurality of exhaust passages may have a plurality of nozzle portions arranged on the upstream side of the catalysts, respectively. Preferably, the nozzle has a narrowing portion at which the cross section area of the exhaust passage thereof is gradually reduced toward the downstream side and an expanding portion at which the cross section area of the exhaust passage gradually increases toward the downstream side between the narrowing portion and the catalyst. The nozzle may be the above-described supersonic nozzle.

Other elements, features, steps, characteristics and advantages of the present invention will become more apparent from the following detailed description of the preferred embodiments with reference to the attached drawings.

BRIEF DESCRIPTION OF THE DRAWINGS

FIG. 15 is a sectional view of an exhaust pipe, along XV-XV of FIG. 13.

FIG. 16A shows an initial state of an exhaust stroke, FIG. 16B shows a state in which the shock wave propagates into a branched passage, and FIG. 16C shows a state in which the shock wave reflected by the branched passage and the exhaust gas collides with each other.

In FIG. 21, the secondary air introducing pipe is drawn while being partially broken.

In FIG. 22, the exhaust pipe and the secondary air introducing pipe are drawn while being partially broken.

In FIG. 24, the exhaust pipe and the secondary air introducing pipe are drawn while being partially broken.

In FIG. 25, the secondary air introducing pipe, reed valves, and a communicating pipe are drawn while being partially broken.

In FIG. 26, the exhaust pipe and the secondary air introducing pipe are drawn while being partially broken.

In FIG. 27, the secondary air introducing pipe, a reed valve, and a communicating pipe are drawn while being partially broken.

DETAILED DESCRIPTION OF THE PREFERRED EMBODIMENTS

First Preferred Embodiment

An outboard motor of a first preferred embodiment of the present invention will be described in detail with reference to FIG. 1 to FIG. 11.

Figure 1:
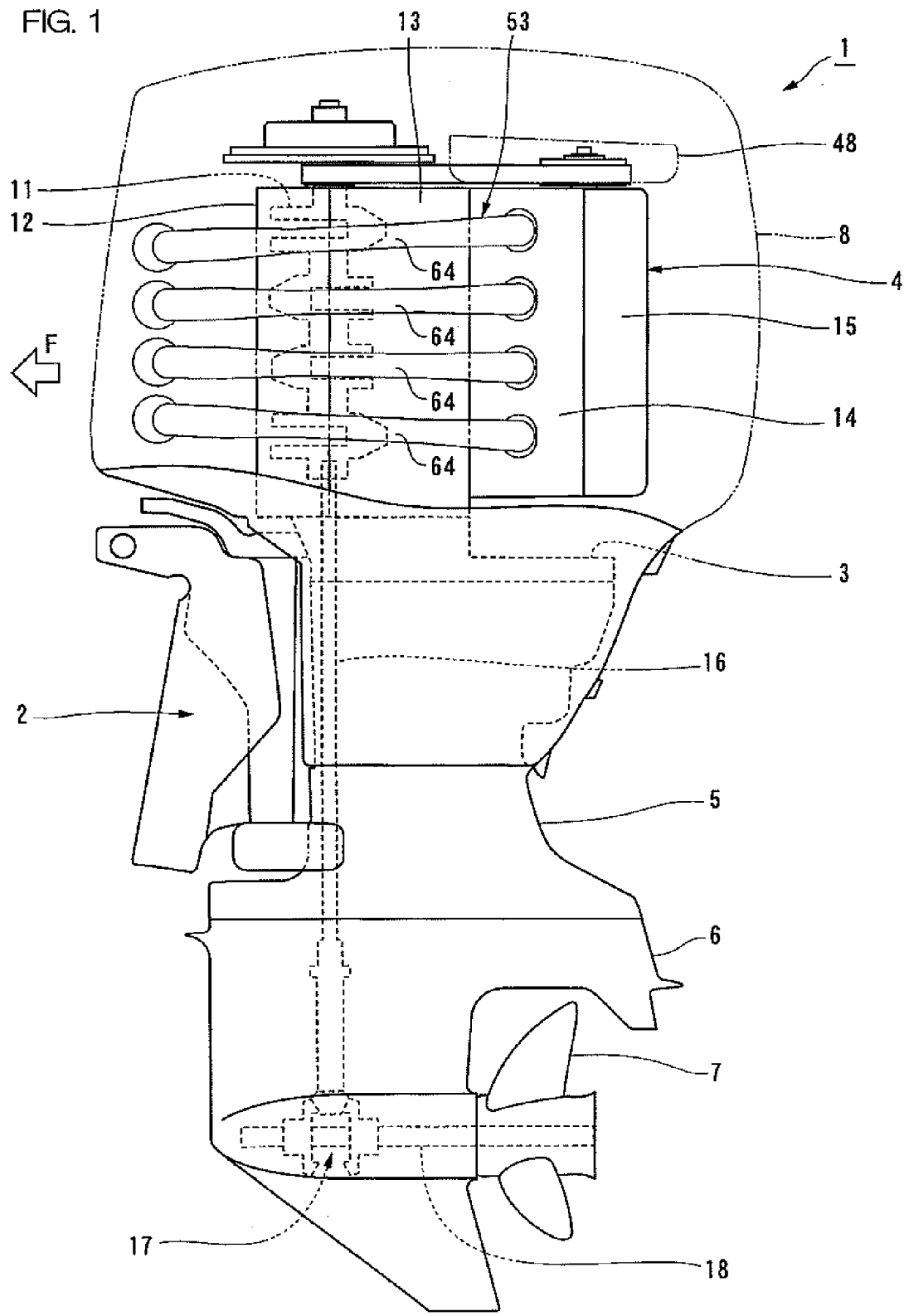
FIG. 1 is a side view of an outboard motor of a first preferred embodiment of the present invention.
Figure 4:
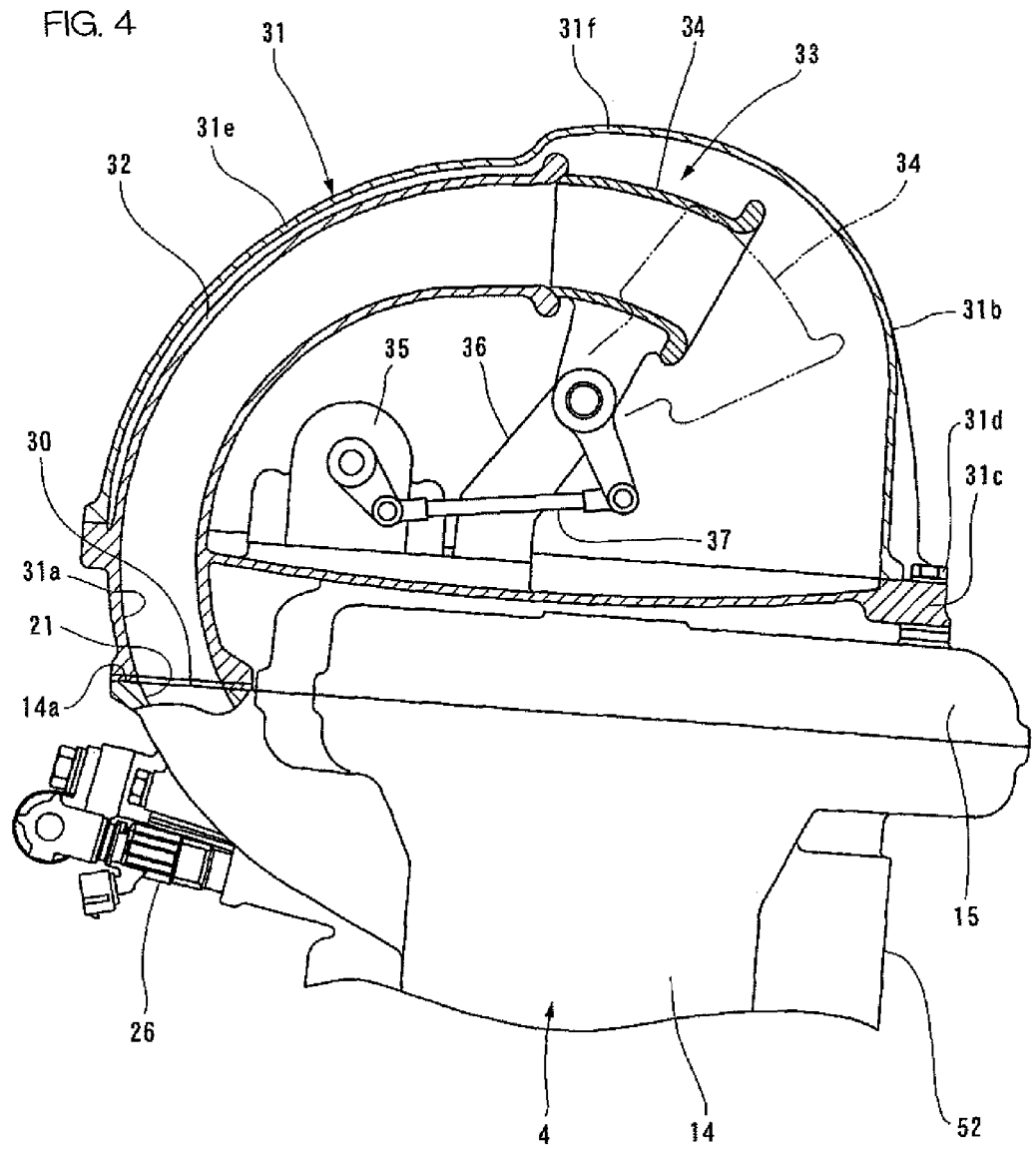
FIG. 4 is a sectional view of an intake surge tank portion.
Figure 5:
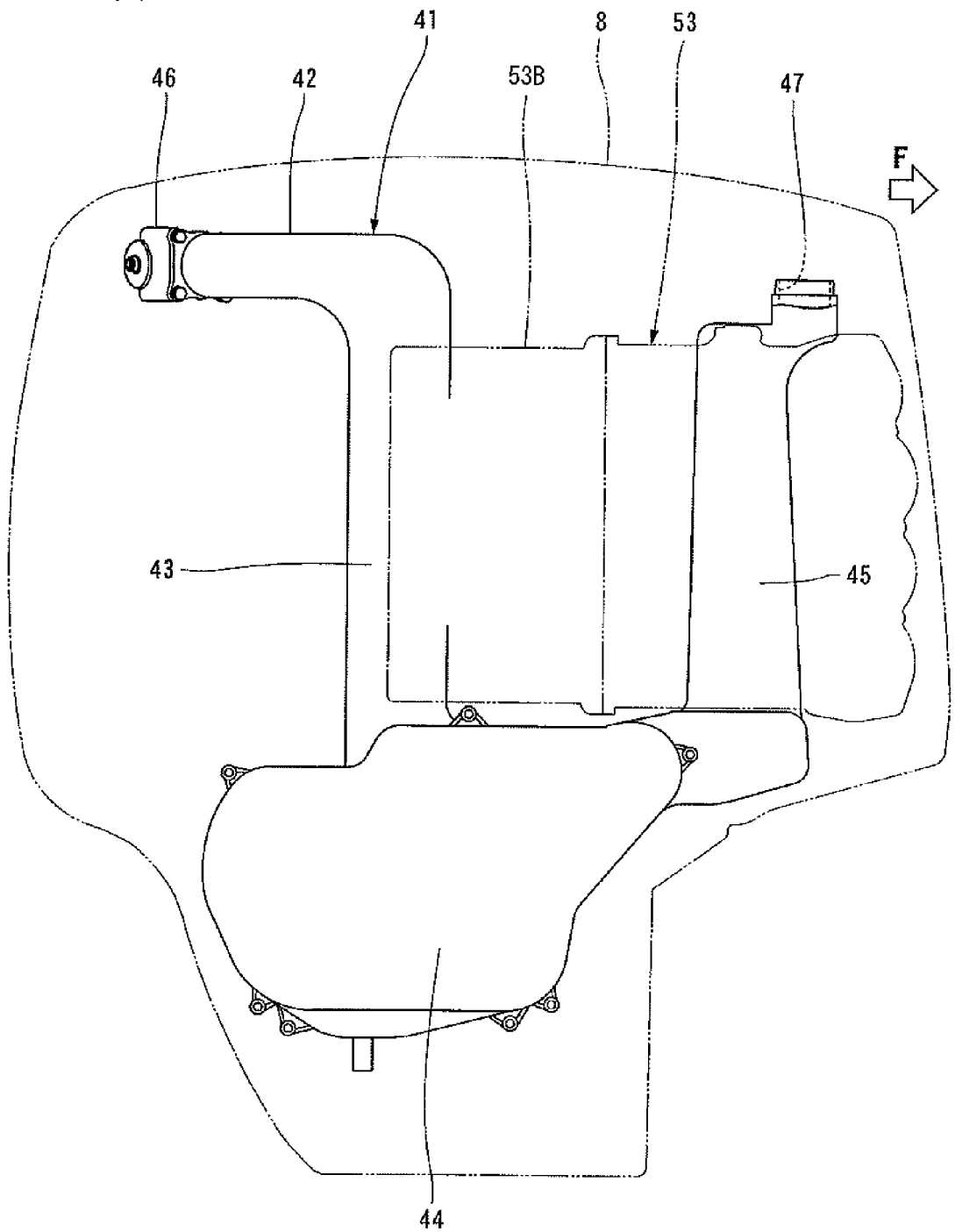
FIG. 5 is a side view of an intake duct.

The outboard motor 1 of this preferred embodiment is to be attached to a transom board of a hull not shown so as to be steered and tilted via a bracket 2. Therefore, the outboard motor 1 can be in various postures with respect to the hull in an actual use state; however, in this specification, for the sake of convenience, based on a predetermined reference posture of the outboard motor 1, up-down, left-right, and front-rear directions are defined. The reference posture is a posture of the outboard motor 1 at a steering angle of zero and a tilt angle of zero with respect to the hull in the horizontal posture. In this condition, when a propulsive force in the forward drive direction is generated from the outboard motor 1, the hull goes straight ahead. In other words, in this specification, as expressions of directions of the outboard motor 1 and the respective members, the heading direction of a hull with the outboard motor 1 when it moves ahead, that is, when it moves straight ahead is simply referred to as the front of the outboard motor 1, and the side 180-degree opposite to the front is referred to as the rear side. The left side of the hull with respect to the heading direction of the hull when the hull moves ahead is referred to as the outboard motor left side or the left side, the right side of the hull with respect to the heading direction when the hull moves ahead is referred to as the outboard motor right side or the right side. Further, the left-right direction of the outboard motor 1 when the hull moves ahead is referred to as the width direction of the outboard motor 1. FIG. 1 shows the outboard motor 1 viewed from the left side, and FIG. 4 and FIG. 5 show the outboard motor 1 viewed from the outboard motor right side. In these figures, the front of the outboard motor 1 is indicated by an arrow F.

FIG. 1 is a side view of the outboard motor 1 of the first preferred embodiment of the present invention. The outboard motor 1 includes an engine support member 3, an engine 4, an upper casing 5, a lower casing 6, a propeller 7, and an engine cover 8. The engine support member 3 is a plate-shaped member joined to the upper end of the bracket 2. On the engine support member 3, the engine 4 is mounted. On the lower portion of the engine support member 3, the upper casing 5 is attached. To the lower end of the upper casing 5, the lower casing 6 is attached. Onto this lower casing 6, the propeller 7 is supported rotatably. The engine cover 8 covers the engine 4. In FIG. 1, etc., the external shape of the engine cover 8 is indicated by a phantom line, and the internal structure is shown.

The engine 4 preferably is a four-cycle four-cylinder engine in this preferred embodiment. The engine 4 is mounted on the engine support member 3 in a posture in which the axis line of the crankshaft 11 extends along the up-down direction. The first to fourth cylinders of the engine 4 are positioned at the rear of the crankshaft 11 (opposite side of the hull with respect to the crankshaft 11).

The crankshaft 11 is arranged so as to penetrate through the engine 4 in the up-down direction. To the lower end of the crankshaft 11, a drive shaft 16 is coupled. The drive shaft 16 extends along the up-down direction from the lower end of the engine 4 to the inside of the lower casing 6. The drive shaft 16 is supported rotatably onto the engine support member 3, the upper casing 5 and the lower casing 6 by bearings (not shown). The lower end of the drive shaft 16 is coupled to a propeller shaft 18 via a forward-reverse switching mechanism 17. The propeller 7 is provided so as to rotate integrally with the propeller shaft 18.

Figure 2:
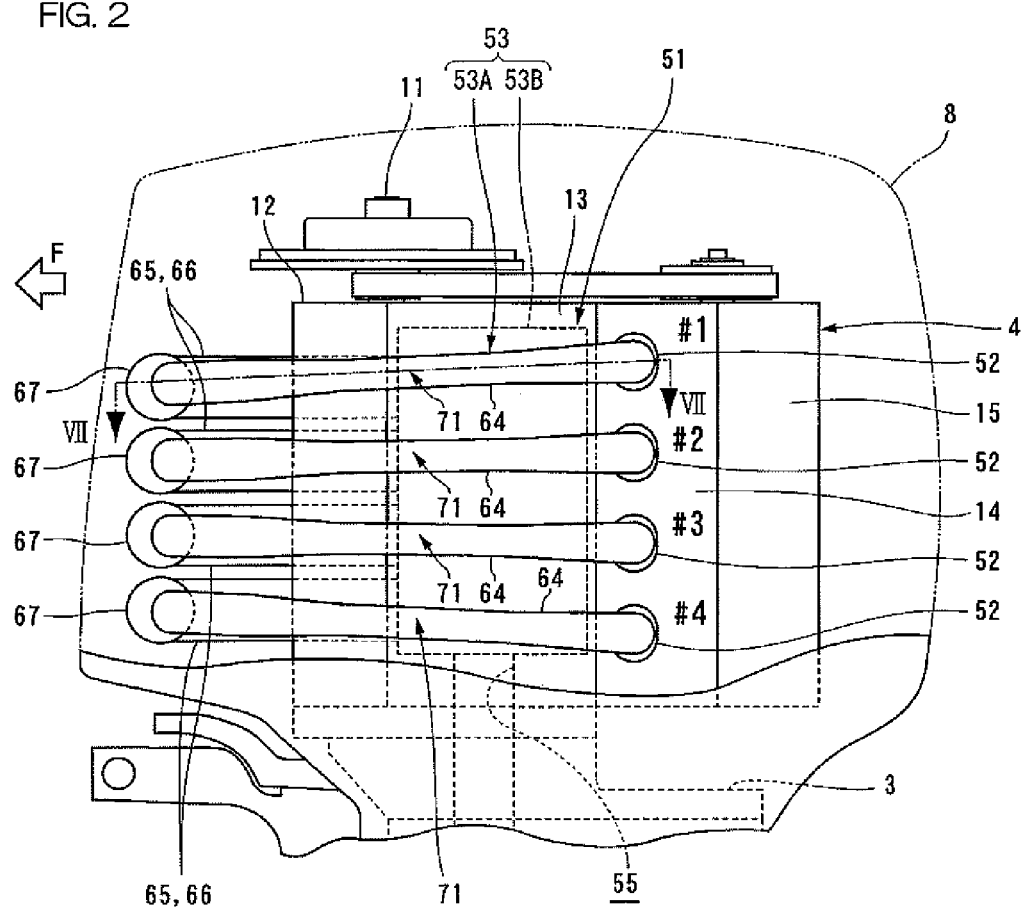
FIG. 2 is an enlarged side view of an engine portion.
Figure 3:
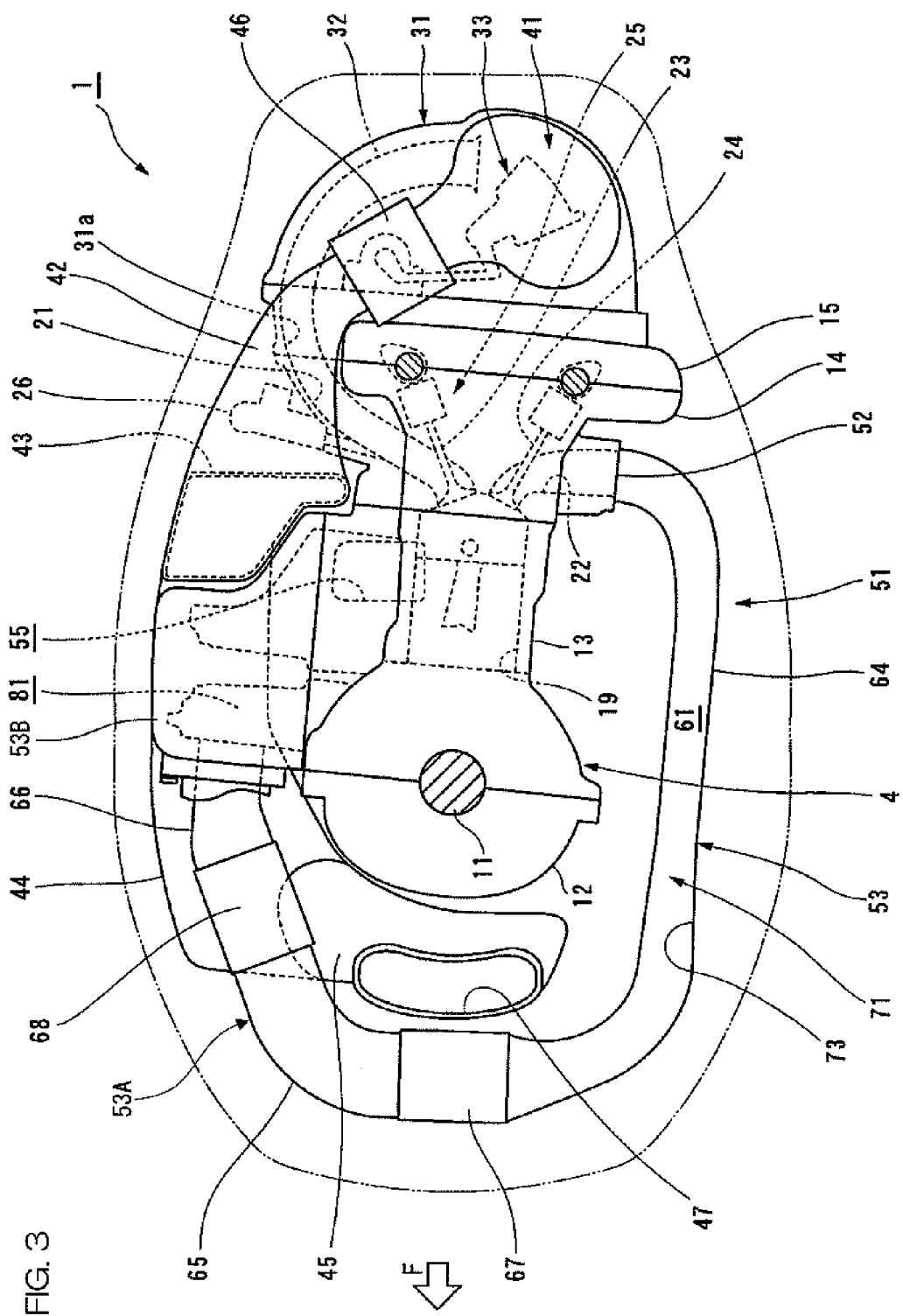
FIG. 3 is an enlarged plan view of the engine portion.

FIG. 2 is an enlarged side view of the engine portion, and FIG. 3 is an enlarged plan view of the engine portion. The engine 4 includes a crank case 12, a cylinder body 13, a cylinder head 14, and a head cover 15. The crank case 12 and the cylinder body 13 support the crankshaft 11 rotatably. To the cylinder body 13, the cylinder head 14 is attached. To this cylinder head 14, the head cover 15 is attached. The crank case 12, the cylinder body 13, the cylinder case 14, and the head cover 15 are mounted on the engine support member 3 in a state in which these are lined up in this order in the front-rear direction of the outboard motor 1. The crank case 12 is positioned on the forefront side of the outboard motor 1.

In the cylinder body 13, four cylinders 19 (see FIG. 3) constituting first cylinder #1 to fourth cylinder #4 are formed and lined up in the up-down direction.

The cylinder head 14 is arranged on the rear portion of the outboard motor as shown in FIG. 3. In other words, the cylinder head 14 is arranged on the opposite side of the crank case 12 in the front-rear direction of the outboard motor 1. In the cylinder head 14, an intake port 21 and an exhaust port 22 are preferably provided for each of the cylinders. Further, the cylinder head 14 is provided with intake valves 23 and exhaust valves 24 for opening and closing these ports 21 and 22. The cylinder head 14 is further provided with a valve operating device 25 for driving these intake and exhaust valves 23 and 24, and an injector 26 for each cylinder for injecting fuel into the corresponding intake port 21.

The intake ports 21 are formed at the side portion on the outboard motor right side of the cylinder head 14, that is, at the side portion on the opposite side of the exhaust ports 22 in the width direction of the outboard motor 1 as shown in FIG. 3. The intake ports 21 extend toward the outboard motor rear side, that is, toward the head cover 15 side so as to separate from the crankcase 12. The respective inlet ends of the intake ports 21 are connected to corresponding intake pipes 32 inside a surge tank 31 arranged behind the head cover 15. The intake surge tank 31 is arranged at the rear end of the engine 4. The rear end of the engine 4 is an end on the opposite side of the crank case 12 in a plan view.

The exhaust ports 22 open on the outer portion (side portion on the outboard motor left side) in the width direction of the outboard motor 1 of the cylinder head 14, and are connected to an exhaust device 51 as shown in FIG. 3. The openings of the exhaust ports 22 define exhaust gas outlets 52. The exhaust gas outlets 52 open toward the left side of the outboard motor 1 on the left side surface of the cylinder head 14. In other words, the exhaust gas outlets 52 are arranged so as to open in the opposite direction of the intake ports 21 in the width direction of the outboard motor 1.

The exhaust device 51 has an exhaust pipe 53 extending to the front of the outboard motor 1 from the cylinder head 14 (to the hull side from the cylinder head 14). Further, the exhaust device 51 is connected to a main exhaust passage 55 extending below via an exhaust chamber 53B forming the downstream side end of the exhaust pipe 53.

FIG. 4 is a sectional view for describing a configuration relating to the intake surge tank 31. The inlet ends of the intake ports 21 open on the end on the outboard motor right side of the rear surface 14a of the cylinder head 14 (rear surface to which the head cover 15 is connected). The openings of the inlet ends of the intake ports 21 define intake inlets 30. The intake inlets 30 are located on the opposite side of the exhaust gas outlets 52 of the cylinder head 14 in the left-right direction of the outboard motor 1. The intake inlets 30 are connected to respective intake holes 31a of the intake surge tank 31 attached to the rear surface 14a of the cylinder head 14. The intake holes 31a are connected to the respective intake pipes 32 inside the intake surge tank 31.

The intake surge tank 31 has a box-shaped intake surge tank main body 31b opening toward the front of the outboard motor 1 (head cover 15 side), and an attaching member 31c which closes the opening portion of the intake surge tank main body 31b. The intake surge tank 31 is attached to the rear portion of the head cover 15 with attaching bolts 31d.

The intake pipes 32 are arranged so as to extend while curving in an arc shape in a plan view. In detail, the intake pipes 32 curve so as to project to the rear side (upper side in FIG. 4) of the outboard motor 1, that is, in the opposite direction of the crank case 12 with respect to the cylinder head 14 from the intake inlets 30. The intake pipes 32 curve so as to project to the left side (right side in FIG. 4) of the outboard motor 1, that is, come closer to the exhaust ports 22 in the left-right direction of the outboard motor 1. The intake pipes 32 are arranged so as to extend across the region from the side wall 31e on the outboard motor right side to the rear wall 31f of the suction surge tank main body 31b. The intake pipes 32 open at positions on the outboard motor rear side inside the intake surge tank 31.

The intake hole 31a and the intake pipe 32 are provided for each cylinder, and define an intake passage for each cylinder in cooperation with the intake port 21 of each cylinder. The inlet ends of the intake pipes 32 define intake ports for intake to the engine 4. Intake passages are arranged so as to extend to the head cover 15 side, so that the length of the intake passages can be secured while the exhaust passage is formed to be long. This will be described in detail later.

At the inlet ends of the intake pipes 32, a variable intake pipe mechanism 33 is provided. The variable intake pipe mechanism 33 includes auxiliary intake pipes 34 removably connected to the intake pipes 32, and a pair of servo motors 35 which drives the auxiliary intake pipes 34. The auxiliary intake pipe 34 is provided for each intake pipe 32 of each cylinder. These auxiliary intake pipes 34 are pivotally supported on a support bracket 36 of the head cover 15 such that they move between the connecting position shown by the solid line in FIG. 4 and the separated position shown by the alternate long and two short dashed line in FIG. 4.

Figure 6:
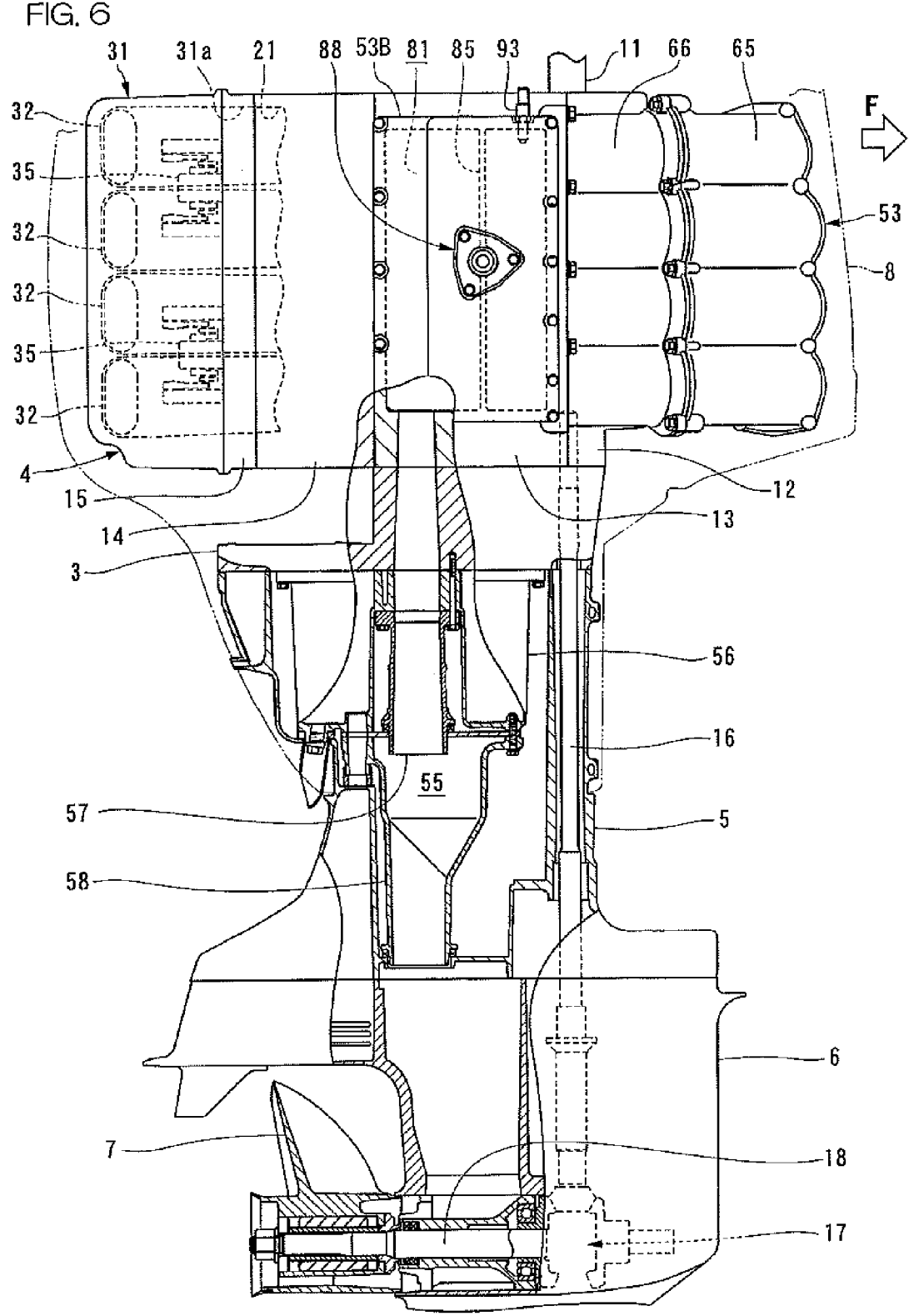
FIG. 6 is a sectional view for describing a configuration of an exhaust system.

These auxiliary intake pipes 34 are joined to the servomotors 35 via links 37, and are driven to turn by the servo motors 35 to be arranged to the connecting position or the separated position. By disposing the auxiliary intake pipes 34 at the connecting position, the substantial intake pipe length becomes relatively long. By moving the auxiliary intake pipes 34 to the separated position, the substantial intake pipe length becomes relatively short. The servo motors 35 are provided at the upper portion and the lower portion of the head cover 15, respectively, as shown in FIG. 6. The servo motor 35 positioned on the upper side drives the first cylinder auxiliary intake pipe 34 and the second cylinder auxiliary intake pipe 34, and the servo motor 35 positioned on the lower side drives the third cylinder auxiliary intake pipe 34 and the fourth cylinder auxiliary intake pipe 34.

To the upper end of the intake surge tank 31, as shown in FIG. 3, an intake duct 41 arranged to lead air to the inside of the intake surge tank 31 is connected as shown in FIG. 3. The intake duct 41 leads the air inside the engine cover 8 to the intake port of the engine 4 (the inlet end of the intake pipes 32 opening inside the intake surge tank 31). The intake duct 41 preferably has a U shape as viewed from the outboard motor right side as shown in the side view of FIG. 5. In other words, the intake duct 41 has a downstream side horizontal portion 42 which has a downstream side end connected to the upper end of the intake surge tank 31 and extends in the front-rear direction at the upper right rear of the engine 4. Further, the intake duct 41 has a downstream side vertical portion 43 which extends downward to the vicinity of the lower end of the engine 4 on the lateral right side of the engine 4 from the front end of the downstream side horizontal portion 42. Further, the intake duct 41 has an upstream side horizontal portion 44 which extends forward from the lower end of the downstream side vertical portion 43. Further, the intake duct 41 has an upstream side vertical portion 45 extending upward to the height of the vicinity of the upper end of the engine 4 from the front end of the upstream side horizontal portion 44. The downstream side horizontal portion 42 is provided with a throttle valve 46 (also see FIG. 3).

At the upper end of the upstream side vertical portion 45, an air suction port 47 opening inside the engine cover 8 is provided. The space inside the engine cover 8 communicates with the atmosphere via the air inlet 48 formed at the rear portion of the outboard motor left side of the engine cover 8 as shown in FIG. 1. The air introduced into the engine cover 8 from the air inlet 48 is suctioned into intake passages of the respective cylinders through the intake duct 41 and the intake surge tank 31.

FIG. 6 is a sectional view for describing a configuration of an exhaust system. The main exhaust passage 55 opens inside water at the shaft center of the propeller 7. The main exhaust passage 55 preferably includes a plurality of members. Specifically, the plurality of members of the main exhaust passage 55 include a cylinder body 13, an engine support member 3, an oil pan 56 attached to the lower end of the engine support member 3, and a pipe 57 attached to the oil pan 56. Further, the plurality of members of the main exhaust passage 55 include a muffler 58 which is attached to the lower end of the oil pan 56 and extends downward, the upper casing 5 which houses the muffler 58, and the lower casing 6.

The exhaust pipe 53 has an exhaust chamber 53B and a bypass exhaust pipe 53A on the upstream side of the exhaust chamber 53B. The bypass exhaust pipe 53A is provided for each cylinder in this preferred embodiment. In FIG. 1 to FIG. 3, the bypass exhaust pipe 53A provided for each cylinder is drawn such that only the external form or contour of the exhaust passage (hereinafter, referred to as an upstream exhaust passage 61) formed inside the bypass exhaust pipe is shown. The bypass exhaust pipe 53A provided for each cylinder is molded by casting into a pipe shape in actuality, and as shown in the sectional view of FIG. 7, has a double pipe structure in which the upstream exhaust passage 61 is covered by a coolant passage 62. The coolant inside the coolant passage 62 flows into the coolant passage 62 from a coolant passage (not shown) of the cylinder head 14 at the connecting portion between the exhaust pipe 53 and the cylinder head 14, and is discharged to a coolant passage 63 inside the exhaust chamber 53B described later (see FIG. 8).

Figure 7:
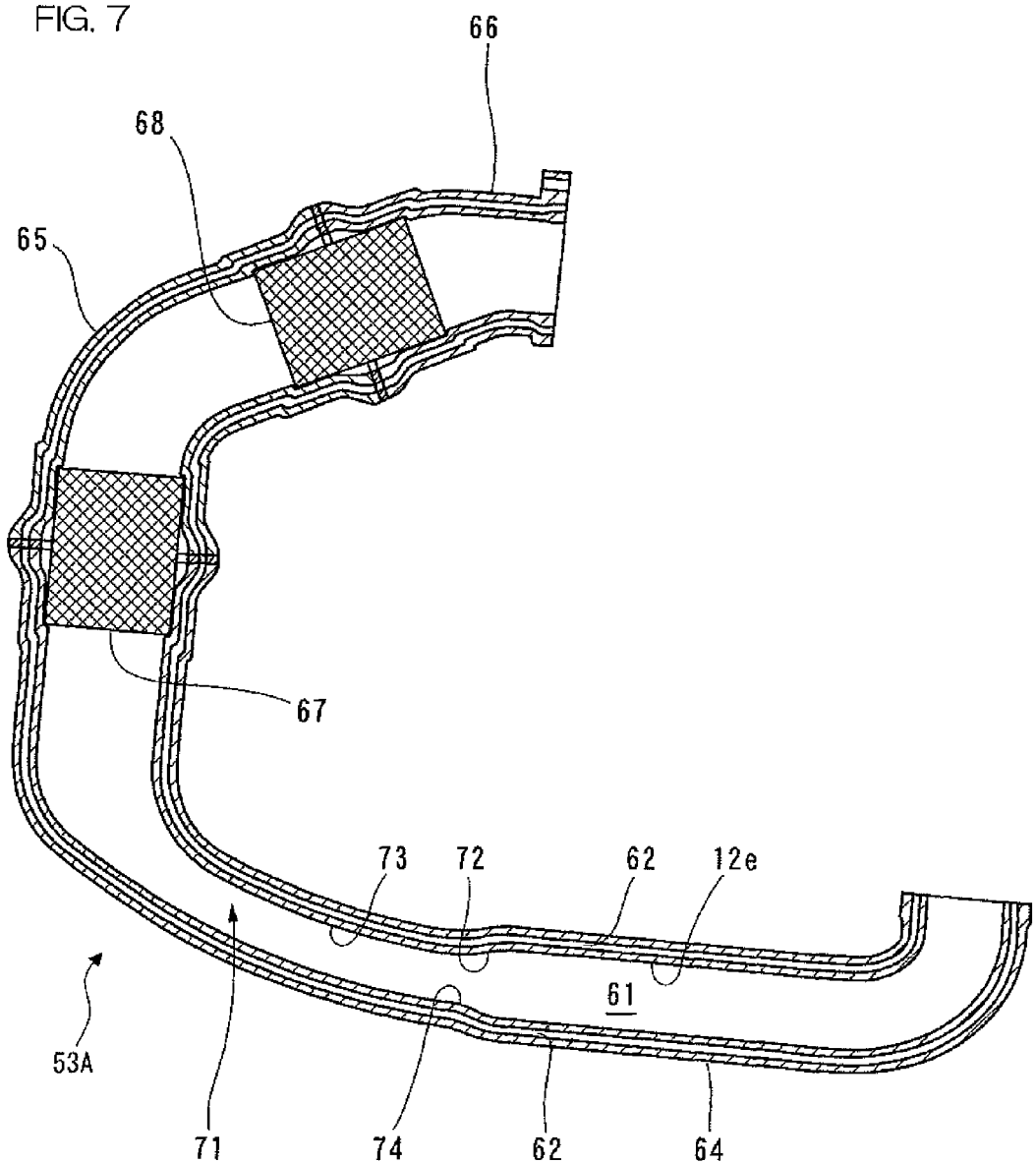
FIG. 7 is a sectional view of an exhaust pipe, along VII-VII of FIG. 2.

The bypass exhaust pipe 53A has, as shown in FIG. 2, FIG. 3, and FIG. 7, a first exhaust pipe 64 for each cylinder, attached to one side portion of the cylinder head 14, and a second exhaust pipe 65 for each cylinder, respectively connected to the downstream end of the first exhaust pipe 64. The bypass exhaust pipe 53A further has a third exhaust pipe 66 for each cylinder, respectively connected to the downstream side end of the second exhaust pipe 65 provided for each cylinder. The downstream side ends of the respective third exhaust pipes 66 are connected commonly to the exhaust chamber 53B.

Inside the connecting portion between the first exhaust pipe 64 and the second exhaust pipe 65, a first catalyst 67 is provided. Inside the connecting portion between the second exhaust pipe 65 and the third exhaust pipe 66, a second catalyst 68 is provided. In other words, two catalysts 67 and 68 are provided for one cylinder on the upstream side of the exhaust chamber 53B. These catalysts preferably are made of, a so-called ternary catalyst. The ternary catalyst can simultaneously detoxify hydrocarbon, nitrogen oxide, and carbon monoxide at the time of combustion near a theoretical air-fuel ratio.

The first catalyst 67 is arranged on the opposite side of the crank case 12 across the air suction port 47 of the intake duct 41 as shown in FIG. 3. In other words, the first catalyst 67 is arranged on the further front of the outboard motor 1 than the air suction port 47 in a plan view.

The first exhaust pipe 64 bends forward, that is, toward the crank case 12 side near the exhaust gas outlet 52, and extends substantially horizontally as shown in FIG. 3. The downstream side end of the first exhaust pipe 64 bends toward the inner side (right side) in the width direction of the outboard motor 1, and arranged ahead of the crank case 12, that is, between the crank case 12 and the engine cover 8. In detail, the downstream side end of the first exhaust pipe 64 is directed toward the right side of the outboard motor front, the opposite side of the exhaust gas outlet 52 in the width direction of the outboard motor 1. In the first exhaust pipe 64, a so-called supersonic nozzle 71 is preferably provided. The supersonic nozzle 71 will be described in detail later.

The second exhaust pipe 65 is connected to the first exhaust pipe 64 ahead of the crank case 12, that is, on the opposite side of the cylinder head 14 with respect to the crank case 12 as shown in FIG. 3. The second exhaust pipe 65 is arranged so as to extend to the diagonally right front of the engine 4.

The third exhaust pipe 66 is arranged on the lateral right side of the engine 4, that is, at a position adjacent aside the crank case 12. The third exhaust pipe 66 extends in the front-rear direction of the outboard motor 1, that is, a direction in which the crank case 12 and the cylinder body 13 are lined up. The third exhaust pipe 66 connects the second exhaust pipe 65 to the exhaust chamber 53B. The exhaust chamber 53B is positioned on the lateral right side of the cylinder body 13, that is, on the opposite side of the first exhaust pipe 64 in the width direction of the outboard motor 1.

These first to third exhaust pipes 64 to 66 define the bypass exhaust pipe 53A. Therefore, the bypass exhaust pipe 53A extends from the exhaust gas outlet 52 in a plan view as shown in FIG. 3. Further, the bypass exhaust pipe 53A extends along the crank case 12 near the outside (near the front) of the crank case 12, and bypasses the engine 4 and extends to the opposite side of the outboard motor 1 in the width direction of the outboard motor 1 (right side of the outboard motor 1). In this preferred embodiment, the bypass exhaust pipe 53A extends substantially horizontally from the exhaust gas outlet 52. Preferably, the length of the bypass exhaust pipe 53A is designed so as to surround the crankshaft 11 with angles not less than 90 degrees in the rotation direction of the crankshaft 11, for example.

The exhaust pipe 53 (the upstream exhaust passage 61 inside the first to third exhaust pipes 64 to 66) and the intake passage on the downstream side of the intake surge tank 31 are preferably formed into substantially an S shape in a plan view. The intake passage on the downstream side of the intake surge tank 31 is an intake passage formed inside the intake pipe 32, the intake hole 31a, and an intake port 21. Of course, the bypass exhaust pipe 53A and the intake passage may be formed into a mirror-reversed S shape in a plan view (that is, S shape in a bottom view). This mirror-reversed S shape is also included in a mode of an "S shape." In other words, the bypass exhaust pipe 53A and the intake passage extend opposite to each other with respect to the width direction of the outboard motor from the cylinder head 14. The intake passage curves so as to bypass the cylinder head at the rear portion of the outboard motor. On the other hand, the bypass exhaust pipe 53A curves so as to bypass the engine 4 to the front of the crank case 12 at the front of the outboard motor.

The supersonic nozzle 71 provided on the first exhaust pipe 64 is arranged to accelerate the flow rate of the exhaust gas from a speed not more than the sonic speed to a supersonic speed. This supersonic nozzle 71 may be a De Laval nozzle invented by De Laval. A De Laval nozzle has a flow passage structure in which a sectional area of a flow path is first reduced then increased.

The supersonic nozzle 71 has, as shown in FIG. 7, a narrowing portion 72, an expanding portion 73, and a throat portion 74. The narrowing portion 72 is formed such that the passage cross section area is gradually reduced toward the downstream side of the flow direction of the exhaust gas. The expanding portion 73 is formed such that the passage cross section area gradually increases toward the downstream side. The throat portion 74 is positioned between the narrowing portion 72 and the expanding portion 73, and has the smallest passage cross section area.

The downstream side end of the first exhaust pipe 64 bends toward the center in the width direction of the outboard motor 1, that is, toward the first catalyst 67. The inner diameter at the downstream side end of the first exhaust pipe 64, that is, the inner diameter of the portion on the downstream side of the expanding portion 73 gradually increases toward the downstream side. Accordingly, the exhaust pipe inner surface can be connected to the first catalyst 67 with a relatively large outer diameter without steps.

The inner diameter at the upstream end of the narrowing portion 72 matches the inner diameter of the upstream portion of the first exhaust pipe 64. The inner diameter at the downstream end of the expanding portion 73 matches the inner diameter of the downstream portion of the first exhaust pipe 64.

Figure 8:
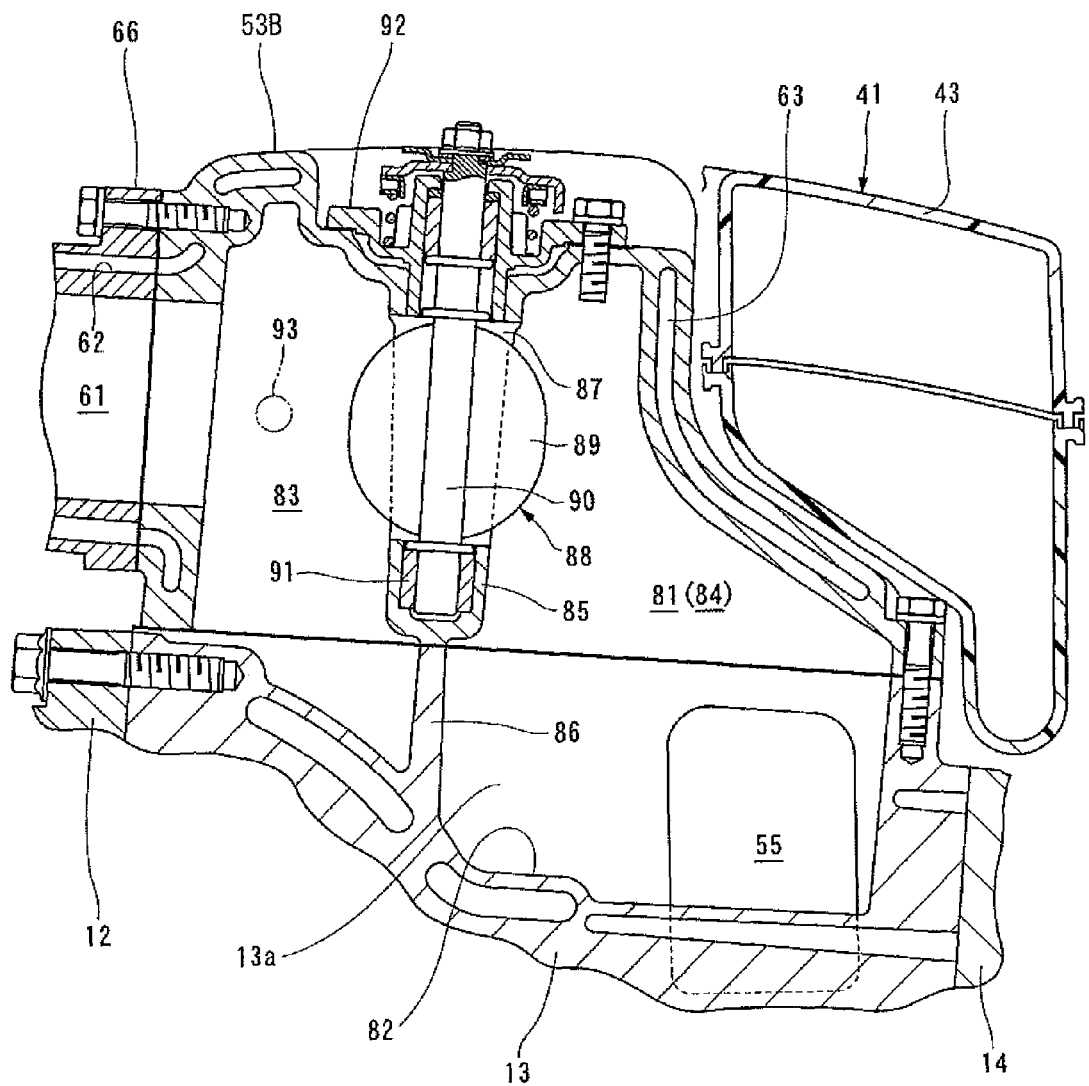
FIG. 8 is a sectional view of an exhaust chamber.

FIG. 8 is a sectional view of the exhaust chamber 53B. The exhaust chamber 53B preferably has a box shape which opens to the cylinder body 13. The exhaust chamber 53B is attached to the side portion on the outboard motor right side of the cylinder body 13 such that the opening portion of the exhaust chamber is closed by the cylinder body 13. On the side portion of the cylinder body 13, a recess portion 82 which opens to the exhaust chamber 53B (to the right side of the outboard motor 1) is formed. The recess portion 82 defines an expansion chamber 81 in conjunction with the exhaust chamber 53B. Accordingly, the expansion chamber 81 has a capacity larger than the inner space of the exhaust chamber 53B. On the lower wall 13a of the cylinder body 13 which forms the side wall on the lower side of the recess portion 82, as shown in FIG. 4 and FIG. 8, the main exhaust passage 55 opens.

Near the lower side of the exhaust chamber 53B, as shown in FIG. 5, the upstream side horizontal portion 44 of the intake duct 41 is positioned. On the opposite side (near the rear side) of the third exhaust pipe 66 of the exhaust chamber 53B, as shown in FIG. 8, the downstream side vertical portion 43 of the intake duct 41 is positioned.

The exhaust chamber 53B preferably has a height in the up-down direction that is longer than the width in the front-rear direction to allow the four third exhaust pipes 66 to be connected thereto (see FIG. 4).

Inside the outer wall of the exhaust chamber 53B, as shown in FIG. 8, a coolant passage 63 is formed. The coolant passage 63 is arranged such that a coolant is supplied from the coolant passage 62 of the third exhaust pipe 66, and the coolant is discharged to a coolant discharge passage (not shown) of the cylinder body 13.

Inside the exhaust chamber 53B, a partition 85 for partitioning the expansion chamber 81 into an upstream exhaust gas chamber 83 and a downstream exhaust gas chamber 84 is provided. The partition 85 partitions the expansion chamber 81 into the above-described two chambers 83 and 84 in cooperation with a longitudinal wall 86 extending from the cylinder body 13. In the partition 85, a communicating hole 87 which makes communication between both the gas chambers 83 and 84 is formed. Further, the partition 85 is provided with an on-off valve 88 which opens and closes the communicating hole 87. The communicating hole 87 is positioned at the central portion in the up-down direction of the partition 85 and also at the central portion of the partition 85 in the width direction of the outboard motor 1. The opening shape of the communicating hole 87 is substantially circular that allows the valve body 89 of the on-off valve 88 to be inserted therein.

The on-off valve 88 preferably is a butterfly valve having a disk-shaped valve body 89 inserted inside the communicating hole 87. The valve body 89 is attached to a valve shaft 90 extending in the width direction of the partition 85. The valve shaft 90 is pivotally supported by a bearing 91 and a cover 92 fixed to the partition 85. The valve shaft 90 is connected to a drive device not shown via a wire, and rotates according to driving of the drive device.

The on-off valve 88 is driven by the drive device so as to close when the crankshaft 11 rotates in reverse or a high negative pressure is generated in the exhaust chamber 53B, and opens in other cases. A sensor (not shown) for detecting the rotating speed of the crankshaft 11 detects whether the crankshaft 11 has rotated in reverse. The pressure inside the exhaust chamber 53B is detected by a pressure sensor not shown.

At the upper end of the exhaust chamber 53B, as shown in FIG. 4, an oxygen sensor 93 is provided for detecting the amount of oxygen in the exhaust gas. The oxygen sensor 93 is arranged at the upper end of the upstream exhaust gas chamber 83, and transmits detection data indicative of the amount of oxygen in the exhaust gas flowing in the upstream exhaust gas chamber 83 to an ECU (Electronic Control Unit, not shown) of the engine 4. The ECU controls the fuel injection amount of the injector 26 and the ignition timing of the ignition plug (not shown), etc., based on the speed of the engine 4, the opening degree of the throttle valve 46, and the amount of oxygen in the exhaust gas detected by the oxygen sensor 93, etc.

The exhaust gases in the cylinders of the engine 4 respectively flow into the exhaust chamber 53B through the bypass exhaust pipes 53A preferably defined by the first to third exhaust pipes 64 to 66 and join together inside the exhaust chamber 53B, and are then discharged to the upstream side end of the main exhaust passage 55. The exhaust gas led into the main exhaust passage 55 is discharged into water through the insides of the lower casing 6 and the propeller 7 from the inside of the upper engine cover 8.

The first to third exhaust pipes 64 to 66 are preferably provided for each cylinder; therefore, on the upstream side of the exhaust chamber 53B, the exhaust gas does not flow into the exhaust passages of other cylinders. In other words, the exhaust pipe 53 in this preferred embodiment can discharge the exhaust gas without exhaust interference.

Figure 9:
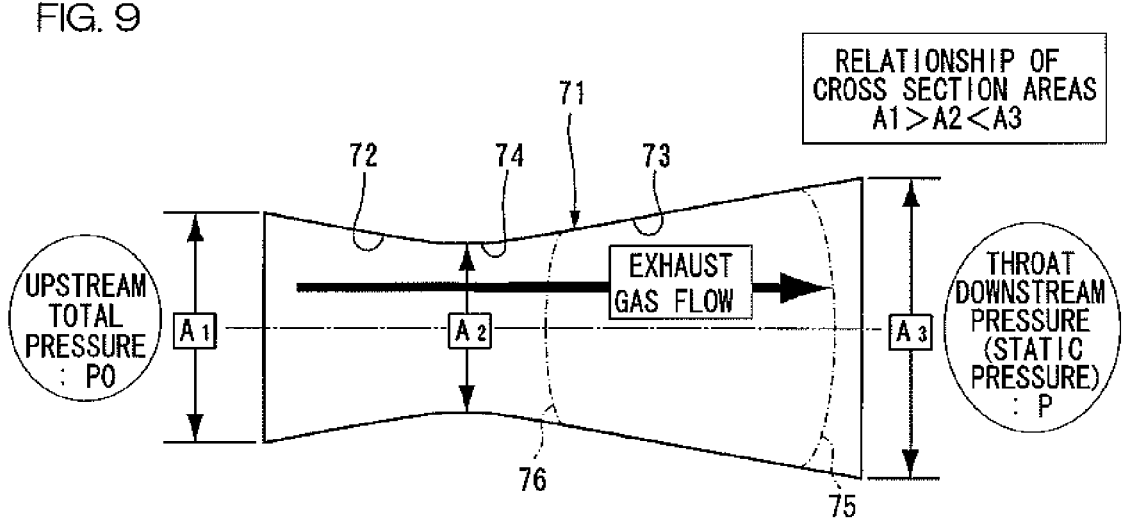
FIG. 9 is a view showing a configuration of a supersonic nozzle.

FIG. 9 is a view for describing in detail the flow channel structure of the supersonic nozzle 71. The cross section area at the upstream end of the narrowing portion 72 (right end in FIG. 2) is referred to as "upstream cross section area A1," and the cross section area at the downstream end (left end in FIG. 2) of the downstream portion is referred to as "downstream cross section area A3." In addition, the cross-section area of the throat portion 74 is referred to as "throat cross section area A2." These satisfy the relationship of A1>A2<A3. In other words, the upstream cross section area A1 and the downstream cross section area A3 are larger than the throat cross section area A2.

The narrowing portion 72, the expanding portion 73, and the throat portion 74 are formed such that their sectional shapes (shapes as viewed from the upstream side of the exhaust passage) are circular or substantially circular.

In this preferred embodiment, the narrowing portion 72 and the expanding portion 73 are formed so as to assume a tapered pipe whose rate of change in cross section area is fixed, that is, whose cross section area changes linearly. However, the supersonic nozzle 71 to be used for the outboard motor 1 according to a preferred embodiment of the present invention is not limited to this shape, and may have a shape whose rate of change in cross section area gradually changes.

The supersonic nozzle 71 is preferably formed so as to satisfy the conditions shown in the following mathematical formulas (1) and (2). Accordingly, when the flow rate of the exhaust gas flowing into the throat portion 74 reaches mach 1 (sonic speed), in the expanding portion 73, the exhaust gas can be accelerated to a higher speed.

$$\frac{dM}{dx} = \frac{\Lambda}{1-M^2} \quad (1)$$

$$\Lambda \equiv M\left[1 + \frac{\gamma-1}{2}M^2\right]\left[\frac{\gamma M^2}{2}\left(\frac{4f}{D}\right) - \frac{1}{A}\frac{dA}{dx}\right] \quad (2)$$

The mathematical formula (1) shows the relationship between the shape of the exhaust pipe 53 and the mach number in a primary flow with viscous friction. The mathematical formula (2) defines $\Lambda$ in the mathematical formula (1).

In these mathematical formulas, M denotes a mach number, A denotes the flow channel cross section area at an arbitrary cross section of the exhaust pipe 53, D denotes a pipe corresponding diameter at the arbitrary cross section, $\gamma$ denotes a specific heat ratio, x denotes the distance (position) in the flow direction, and f denotes a friction coefficient.

Figure 10:
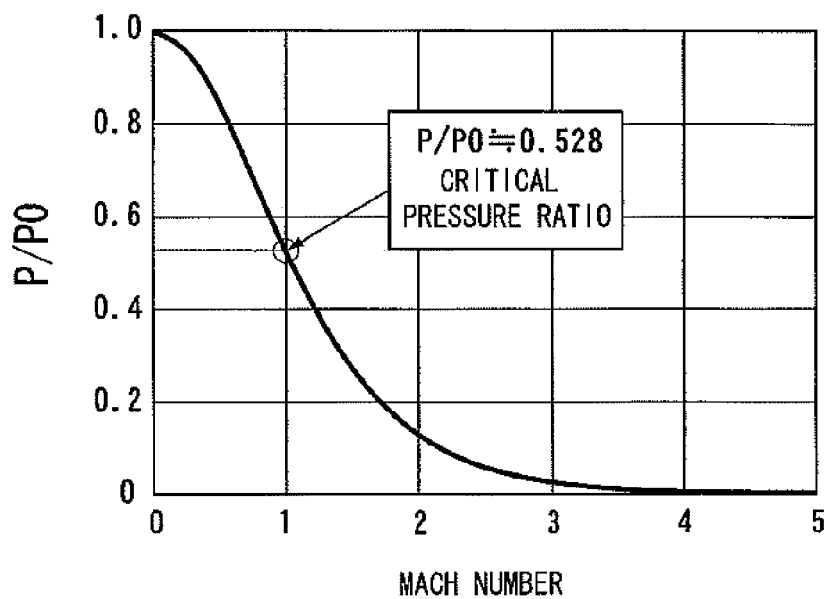
FIG. 10 is a graph showing the relationship between the pressure ratio of the upstream and the downstream of the supersonic nozzle and the Mach number.

FIG. 10 is a view showing the relationship of the mach number with the ratio (P/P0) of the total pressure (P0) of the upstream of the inlet of the supersonic nozzle 71 and the static pressure (P) of the downstream of the throat portion 74. As is understood from this figure, the mach number reaches "1" under a condition that the ratio (P/P0) is smaller than the critical pressure ratio of 0.528. In other words, according to a rise in the upstream total pressure (P0) to make the ratio (P/P0) smaller than the critical pressure ratio of 0.528, the flow rate of the exhaust gas is accelerated when passing through the narrowing portion 72 and the flow rate of the exhaust gas flowing into the throat portion 74 reaches the sonic speed.

When the flow rate of the exhaust gas flowing into the throat portion 74 thus reaches the sonic speed, a shock wave is generated inside the supersonic nozzle 71. This shock wave is accelerated when passing through the expanding portion 73 of the supersonic nozzle 71. When the shock wave is thus generated, inside the throat portion 74, a shock wave 75 and an expansion wave 76 composed of a pressure wave advancing opposite to the shock wave 75 are generated.

While the shock wave 75 is accelerated in the expanding portion 73 of the supersonic nozzle 71, the expansion wave 76 advances opposite to the shock wave 75. Accordingly, an excessive negative pressure is generated between the shock wave 75 and the expansion wave 76. As a result, the temperature of the exhaust gas between the shock wave 75 and the expansion wave 76 lowers.

The shock wave 75 and the expansion wave 76 propagate inside the first exhaust pipe 64 positioned on the upstream side of the first catalyst 67. Therefore, a negative pressure is generated inside the first exhaust pipe 64, and as a result, the temperature of the exhaust gas inside the first exhaust pipe 64 lowers.

Examples of technical effects in the outboard motor 1 of this preferred embodiment will be described hereinafter.

The bypass exhaust pipe 53 preferably including the first to third exhaust pipes 64 to 66 defines a horizontal portion substantially along the horizontal plane at the height of the exhaust gas outlet 52. In a plan view, these first to third exhaust pipes 64 to 66 extend from the exhaust gas outlet 52 of the cylinder head 14, pass the vicinity of the outside of the crank case 12 to bypass the engine 4, and reach the opposite side in the width direction of the outboard motor 1. Therefore, the exhaust gas discharged from the cylinder head 14 can be made to flow along the exhaust passage swirling in one direction around the engine 4 in a plan view.

Therefore, according to the outboard motor 1 of this preferred embodiment, as compared to the outboard motor of the prior art in which the exhaust gas flows while changing its direction a plurality of times, the exhaust resistance can be reduced. As a result, an outboard motor which can be further improved in output can be provided.

Further, in this preferred embodiment, the cylinder head 14 is arranged on the outboard motor rear side opposite to the crank case 12 in the front-rear direction of the outboard motor 1. To the rear portion of the cylinder head 14, the head cover 15 is attached. Further, at the rear of the head cover 15, the intake surge tank 31 is provided. Therefore, the intake surge tank 31 can be arranged on the opposite side of the exhaust pipe 53 in the front-rear direction of the outboard motor 1. Therefore, the intake surge tank 31 does not interfere with the exhaust pipe 53, so that the surge tank 31 can be formed to have a predetermined capacity, and at the same time, the exhaust pipe 53 can be formed to have a predetermined length.

In this preferred embodiment, the cylinder head 14 has an intake inlet 30 formed on the opposite side of the exhaust gas outlet 52 in the width direction of the outboard motor 1. In addition, the intake surge tank 31 communicates with the intake inlet 30 via the intake pipe 32 curving in the width direction of the outboard motor 1. Therefore, although the intake surge tank 31 is arranged near the rear of the cylinder head 14, a necessary intake passage length can be secured.

In this preferred embodiment, the intake passage on the downstream side of the intake surge tank 31 and the exhaust pipe 53 are preferably formed into a substantially S shape in a plan view. Therefore, a necessary intake passage length can be secured while the intake resistance is minimized to be as small as possible, and at the same time, interference between the intake passage and the exhaust pipe 53 can be prevented. Therefore, the passage length of the exhaust passage inside the exhaust pipe 53 can be formed to be sufficiently long.

In this preferred embodiment, at the side portion of the cylinder head 14, the exhaust gas outlets 52 of the respective cylinders are formed. Upstream exhaust passages 61 connected to these exhaust gas outlets 52 extend along a substantially horizontal plane to the vicinity of the crankshaft 11 from the exhaust gas outlets 52 in a side view, and are independent on a cylinder basis and separated from the upstream exhaust passages 61 of other cylinders. Therefore, in this preferred embodiment, the upstream exhaust passages 61 connected to the exhaust gas outlets 52 of the respective cylinders can be formed to be long independently. Accordingly, for the following two reasons, the pressure inside the upstream exhaust passages 61 can be lowered, so that the amount of exhaust gas remaining in the cylinder 19 due to internal EGR (Exhaust Gas Recirculation) can be reduced.

(1) First Reason

When the exhaust valve 24 opens during engine operation, an exhaust gas with a high-pressure inside the cylinder 19 passes through the gap between the valve body of the exhaust valve 24 and the valve seat on the cylinder head 14 side and jets out to the exhaust port 22. It is known that the flow rate of the exhaust gas flowing in the gap reaches the sonic speed even when the number of rotations of the engine is approximately 2000 rpm. When the flow rate of the exhaust gas flowing in the gap reaches the sonic speed, and the exhaust gas flows into the exhaust port 22 with a relatively large passage cross section area, a shock wave is generated inside the exhaust port 22. This shock wave advances toward the downstream side inside the upstream exhaust passage 61.

Inside the exhaust passage in which a shock wave has been thus generated, an expansion wave which advances opposite to the shock wave is also generated. The pressure in the region between the expansion wave and the shock wave becomes negative. According to this preferred embodiment, the upstream exhaust passage 61 connected to the exhaust gas outlet 52 can be formed to be sufficiently long, so that the time during which the shock wave and the expansion wave are allowed to exist in the upstream exhaust passage 61 becomes longer. As a result, a high negative pressure is generated inside the upstream exhaust passage 61.

(2) Second Reason

The pressure inside the upstream exhaust passage 61 gradually rises from the upstream side toward the downstream side according to discharge of the exhaust gas from the exhaust port 22. The upstream exhaust passages 61 of the plurality of cylinders are collected at the downstream side, so that the pressure is also transmitted to the upstream exhaust passages 61 of other cylinders via the collecting portion (exhaust chamber 53B) of the upstream exhaust passages 61. According to this preferred embodiment, the lengths of the upstream exhaust passages 61 connected to the exhaust gas outlets 52 can be formed to be long, so that the time during which the pressure reaches the exhaust ports 22 of other cylinders can be lengthened.

In other words, it is assumed that, when an exhaust valve 24 of the first cylinder (for example, cylinder #1) which is ignited first between two cylinders whose ignition timings are close to each other is open, the exhaust gas is discharged to the upstream exhaust passage 61 of the second cylinder (for example, cylinder #3) which is ignited second. The upstream exhaust passages 61 are long, so that the time until the pressure of the exhaust gas of the second cylinder is transmitted to the exhaust port 22 of the first cylinder via the upstream exhaust passage 61 is long. Therefore, when the exhaust valve 24 is open in the first cylinder, exhaust interference is not received by the exhaust gas of the second cylinder. Therefore, the discharge of the exhaust gas in the first cylinder can be prevented from being obstructed by the exhaust interference.

Therefore, according to this preferred embodiment, the exhaust pressure in the upstream exhaust passage 61 can be lowered during the exhaust stroke, so that the exhaust gas can be smoothly discharged into the exhaust passage from inside the cylinder 19. Therefore, the amount of exhaust gas remaining in the cylinder 19 due to internal EGR is reduced.

As a result, during the intake stroke, the temperature of intake suctioned into the cylinder 19 can be prevented from being raised by the heat of the exhaust gas. Therefore, the temperature of the intake suctioned into the cylinder 19 becomes relatively low, so that an occurrence of abnormal combustion such as self-ignition and knocking can be reliably prevented.

In the first exhaust pipe 64, the supersonic nozzle 71 is provided which includes the narrowing portion 72 at which the cross section area of the upstream exhaust passage 61 is gradually reduced toward the downstream side, the expanding portion 73 at which the cross section area of the upstream exhaust passage 61 gradually increases toward the downstream side between the narrowing portion 72 and the first catalyst 67. The supersonic nozzle 71 accelerates the exhaust gas and the flow rate of the exhaust gas reaches the sonic speed, and accordingly, a negative pressure is generated inside the first exhaust pipe 64 as described above, and accordingly, the temperature of the exhaust gas in the first exhaust pipe 64 lowers.

Therefore, according to this preferred embodiment, the exhaust gas in the cylinder 19 is efficiently discharged to the upstream exhaust passage 61 due to the above-described negative pressure, so that the amount of exhaust gas remaining in the cylinder 19 due to internal EGR can be further reduced. Therefore, during operation of the engine 4, it is possible to effectively suppress self-ignition or knocking.

The upstream exhaust passage 61 of each cylinder passes through the vicinity of the outside of the crank case 12 from the exhaust gas outlet 52 and bypasses the engine 4 in a plan view, and is connected to the exhaust chamber 53B positioned on the opposite side in the width direction of the outboard motor 1. The upstream exhaust passage 61 is connected to the main exhaust passage 55 via the exhaust chamber 53B. Therefore, the upstream exhaust passage 61 can be formed as long as possible around the engine 1, so that a higher negative pressure can be caused inside the upstream exhaust passage 61.

Further, in the outboard motor 1 of this preferred embodiment, two catalysts are preferably provided each in the upstream exhaust passage 61 of each cylinder, so that the following effects are obtained.

When the first and second catalysts 67 and 68 are made of a ternary catalyst, if the flow rate of the exhaust gas passing through the catalysts 67 and 68 is high, redox reaction hardly occurs in the catalysts 67 and 68, and the exhaust gas purifying efficiency of the catalysts 67 and 68 lowers. To solve this problem, the space velocity S/V value when the exhaust gas passes through the catalysts 67 and 68 must be lowered. The S/V value can be obtained from the following mathematical formula (3).

$$S/V \text{ value} = \frac{\text{displacement} \times \text{engine speed} \times \text{coefficient} \times \text{inhalation efficiency}}{2 \times \text{catalyst volume}} \quad (3)$$

In the mathematical formula (3), the coefficient is 1 in the case of a 4-cycle engine, and is 2 in the case of a 2-cycle engine. The inhalation efficiency can be set to, for example, 0.75. The catalyst volume can be obtained from the following mathematical formula (4).

$$\text{Catalyst volume (cm}^3\text{)} = \quad (4)$$
$$(\text{Catalyst outer diameter})^2 \times \pi \times (\text{foil length}) \times \frac{1}{4} \times 10^{-3}$$

In this preferred embodiment, two catalysts (first and second catalysts 67 and 68) are provided for one cylinder, so that the catalyst volume is increased and the S/V value can be reduced. Therefore, the flow rate of the exhaust gas passing through the first and second catalysts 67 and 68 can be lowered, and the exhaust gas purifying efficiency can be increased.

In this preferred embodiment, the first catalyst 67 and the second catalyst 68 are separately arranged on the upstream side and the downstream side, so that the outer diameters of the catalysts can be formed to be small when the catalyst volume is increased. Therefore, the catalyst volume can be increased while preventing the outboard motor 1 from increasing in size.

Further, the first catalyst 67 is arranged ahead of the crank case 12 (on the opposite side of the cylinder body 13 with respect to the crank case 12). Therefore, the distance between the exhaust gas outlet 52 of the cylinder head 14 and the first catalyst 67 can be set as long as possible. Therefore, the catalyst 67 can be arranged at a position at which the temperature thereof does not excessively rise.

It is generally known that if a catalyst is continuously exposed to an excessively high temperature, it deteriorates due to the so-called sintering phenomenon, and the purifying efficiency deteriorates. The sintering phenomenon is a phenomenon in which a catalyst is kept long at a high temperature not less than about 850° C., noble metals in the catalyst thermally adhere to each other, and the surface area of the noble metals is reduced.

According to this preferred embodiment, the first and second catalysts 67 and 68 are arranged at positions greatly separated from the exhaust gas outlets 52, so that the catalysts are prevented from excessively rising in temperature. Therefore, an occurrence of the sintering phenomenon can be prevented.

Further, in this preferred embodiment, the catalysts 67 and 68 are respectively provided in the upstream exhaust passage 61 of each cylinder, so that exhaust gas is led to the catalysts 67 and 68 from only one cylinder. Therefore, in comparison with the case where exhaust gas is led to the catalysts from a plurality of cylinders, the temperatures of the catalysts can be kept low. As a result, the catalysts 67 and 68 can be prevented from becoming excessively high in temperature, and an occurrence of the sintering phenomenon can be prevented.

Further, in this preferred embodiment, the supersonic nozzle 71 is provided on the upstream side of the first catalyst 67. The exhaust gas is accelerated by this supersonic nozzle 71 and the flow rate of the exhaust gas reaches the sonic speed, and accordingly, as described above, a negative pressure is generated inside the first exhaust pipe 64. Accordingly, the temperature of the exhaust gas in the first exhaust pipe 64 lowers. Therefore, the exhaust gas at a relatively low temperature can be made to flow into the first catalyst 67, so that an occurrence of the sintering phenomenon can be more reliably prevented.

On the other hand, in the exhaust device 51 of this preferred embodiment, the inside of the exhaust chamber 53B is partitioned by the partition 85 into the upstream exhaust gas chamber 83 and the downstream exhaust gas chamber 84. The communicating hole 87 is formed in the partition 85, and the on-off valve 88 which opens and closes this communicating hole 87 is provided. Therefore, by closing the on-off valve 88, the exhaust passage can be closed inside the exhaust chamber 53B. Accordingly, the exhaust passage (upstream exhaust passage 61) on the upstream side of the exhaust chamber 53B can be shut off from the exhaust passage (main exhaust passage 55) on the downstream side.

Therefore, in the outboard motor 1 of this preferred embodiment, when water flows back inside the main exhaust passage 55, the water can be prevented by the exhaust chamber 53B from reaching the engine 4 through the exhaust pipe 53 (catalysts 67 and 68).

The reversed flow of water inside the main exhaust passage 55 occurs in rare cases when the shift position is switched to "reverse" by the forward-reverse switching mechanism 17 to brake the hull when the hull goes ahead. In other words, while the hull goes ahead at high speed, when the forward-reverse switching mechanism 17 of the outboard motor 1 is switched to the reverse side, the propeller 7 is subjected to a strong force due to water. If this force exceeds the driving force of the engine 4, the drive shaft 16 (engine 4) is rotated in reverse.

When the engine 4 is thus rotated in reverse, the piston lowers while the exhaust valve 24 is open, and the exhaust gas in the exhaust passage is suctioned into the cylinder 19. As the time during which the engine 4 rotates in reverse becomes longer, the amount of the exhaust gas suctioned into the engine 4 becomes larger, and the negative pressure inside the exhaust passage becomes higher. Due to this negative pressure, water rises inside the main exhaust passage 55. When the outboard motor 1 is used at sea, seawater enters the exhaust passage.

When seawater enters the inside of the exhaust passage and comes into contact with the catalysts 67 and 68, the seawater poisons and deteriorates the catalysts 67 and 68 due to constituents of seawater such as Na, Mg, and Cl, etc. If water is poured on the catalysts 67 and 68 at a high temperature, sudden shrinkage may occur and crack the catalysts 67 and 68. Further, if water goes upstream in the exhaust passage and is suctioned into the engine 4, a so-called water hammer phenomenon may occur and break the engine 4.

In the outboard motor 1 of this preferred embodiment, as described above, when water goes upstream inside the exhaust passage (when the engine 4 rotates in reverse or the inside of the exhaust chamber 53B becomes an excessively low pressure), the on-off valve 88 in the exhaust chamber 53B closes. Accordingly, the water going upstream can be stopped by the exhaust chamber 53B, so that water can be reliably prevented from being suctioned into the engine 4 through the exhaust pipe 53.

Therefore, it can be reliably prevented that the catalysts 67 and 68 are contacted and deteriorated by seawater and the catalysts 67 and 68 at a high temperature are suddenly cooled and broken by water. Of course, an occurrence of the water hammer phenomenon can also be prevented.

Second Preferred Embodiment

Figure 11:
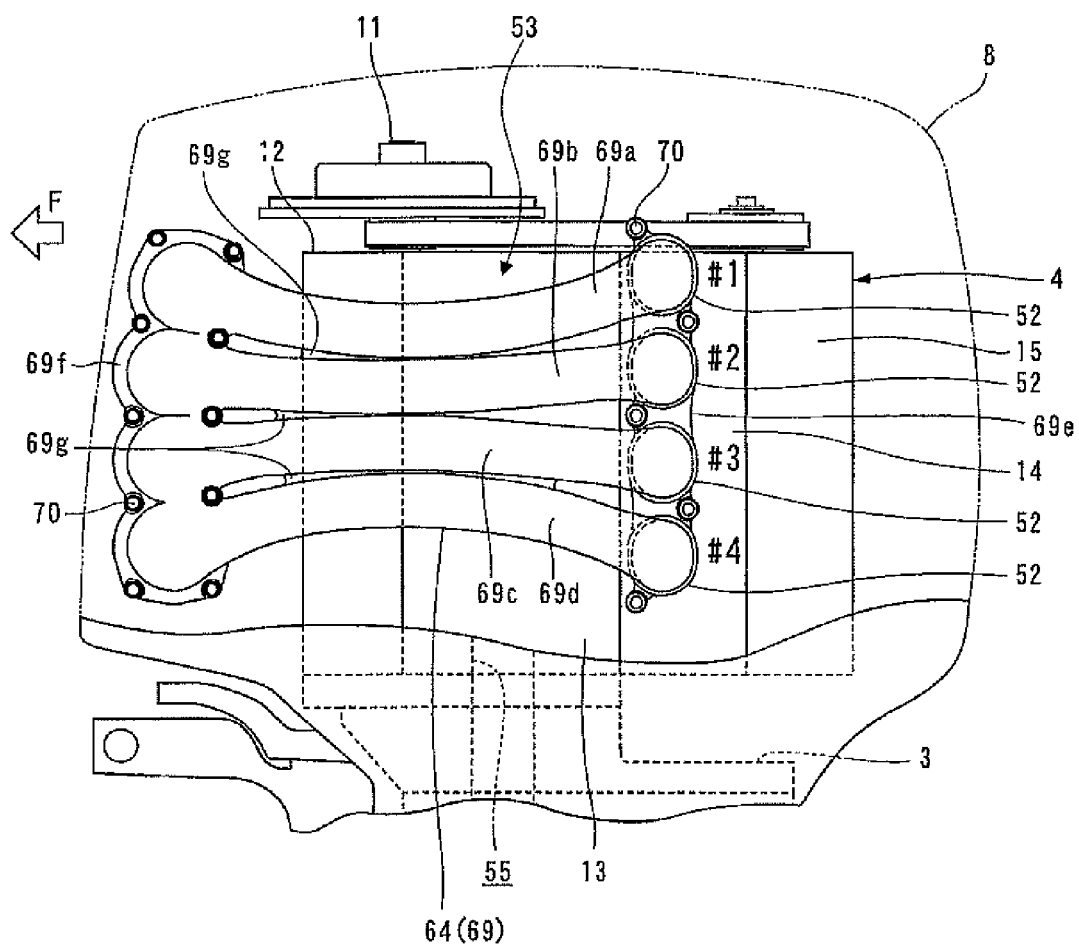
FIG. 11 is an enlarged side view of a configuration of an engine portion of an outboard motor of a second preferred embodiment of the present invention.

FIG. 11 is an enlarged side view of a configuration of an engine portion of an outboard motor of a second preferred embodiment of the present invention, showing a detailed configuration example of the first exhaust pipe 64.

The first exhaust pipe 64 of this preferred embodiment preferably consists of one tubular member 69. The tubular member 69 includes four tubular portions 69a to 69d (for the respective cylinders) for forming the exhaust passages. The tubular member 69 includes an upstream side attaching flange 69e connected to the upstream side ends of the tubular portions 69a to 69d, and a downstream side attaching flange 69f connected to the downstream side ends of the tubular portions 69a to 69d. The tubular member 69 further includes ribs 69g connecting the tubular portions 69a to 69d to each other. The tubular member 69 is preferably formed by integrally molding by casting the tubular portions 69a to 69d, the flange 69e, the flange 69f, and the ribs 69g.

Figure 12:
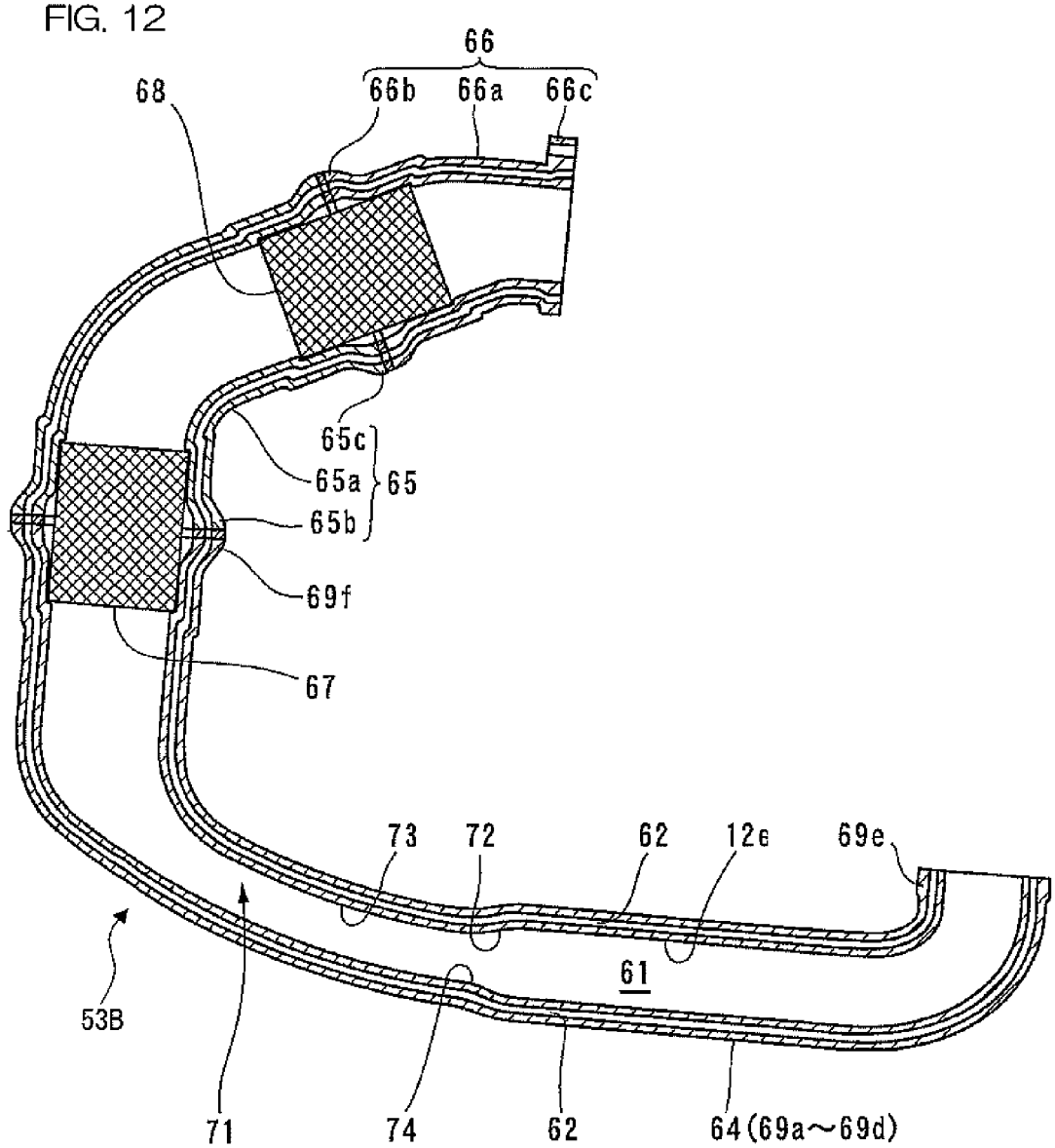
FIG. 12 is a sectional view of an exhaust pipe in the second preferred embodiment of the present invention.

FIG. 12 is a sectional view of an exhaust pipe. The tubular portions 69a to 69d are preferably arranged in a double tube structure having an upstream exhaust passage 61 and a coolant passage 62 covering the periphery of the upstream exhaust passage 61 provided for each cylinder. Among these four tubular portions 69a to 69d, the first cylinder tubular portion 69a and the second cylinder tubular portion 69a are formed such that their central portions in the longitudinal direction are positioned lower than both ends and curve in an arc shape projecting downward in the side view of FIG. 11.

The radius of curvature of the first cylinder tubular portion 69a assuming an arc shape in the side view is smaller than that of the second cylinder tubular portion 69b. In addition, the third cylinder tubular portion 69c and the fourth cylinder tubular portion 69d are formed such that their central portions in the longitudinal direction are positioned higher than both ends and curve in an arc shape projecting upward in the side view. The radius of curvature of the fourth cylinder tubular portion 69d assuming an arc shape in the side view is smaller than that of the third cylinder tubular portion 69c.

Thus, by forming the four tubular portions 69a to 69d to be curved, the intervals between the adjacent pair of the four tubular portions 69a to 69d become narrowest at the central portion between the upstream side end and the downstream side end of the tubular member 69. The portions at which the tubular portions 69a to 69d are close to each other are formed such that the tubular portions adjacent to each other in the up-down direction are connected without a gap, and a pair of upstream exhaust passages 61 adjacent to each other in the up-down direction are partitioned by one wall.

The upstream side ends of the four tubular portions 69a to 69d are connected to the upstream side attaching flange 69e while being separated from each other. This upstream side attaching flange 69e is formed into a plate shape, and joins the upstream side ends of the four tubular portions 69a to 69d to each other. This upstream side attaching flange 69e is attached to an exhaust pipe attaching seat (not shown) formed on the outer side surface of the cylinder head 14 with a plurality of bolts 70.

The downstream side ends of the tubular portions 69a to 69d are formed to be relatively thick such that they can house the first catalyst 67 inside. Therefore, the tubular portions adjacent to each other in the up-down direction are connected and integrated together. The downstream side attaching flange 69f is formed so as to surround the tubular portions 69a to 69d thus integrated from all around. This downstream side attaching flange 69f is attached to the second exhaust pipe 65 (see FIG. 4) with a plurality of bolts 70.

The second exhaust pipe 65 is preferably formed by integrally molding by casting four tubular portions 65a having upstream exhaust passages 61 for the respective cylinders and flanges 65b and 65c positioned at the upstream side ends and the downstream side ends of these tubular portions 65a.

The third exhaust pipe 66 is preferably formed by integrally molding by casting four tubular portions 66a having upstream exhaust passages 61 provided for the respective cylinders and flanges 66b and 66c positioned at the upstream side ends and the downstream side ends of the tubular portions 66a.

According to this preferred embodiment, the upstream portion to be connected to the exhaust gas outlet 52 of the upstream exhaust passage 61 is preferably formed of a tubular member 69 formed by integrally molding the tubular portions 69a to 69d for forming exhaust passages of the respective cylinders. Therefore, as compared to the case where the first exhaust pipe 64 of the bypass exhaust pipe 53A is formed of four pipes, the manufacturing cost of the bypass exhaust pipe 53A can be reduced. Further, the four tubular portions 69a to 69d are connected to each other, so that the rigidity of the first exhaust pipe 64 increases. Further, the area of the connecting portion among the bypass exhaust pipe 53A formed of an assembly of the first exhaust pipe 64, the second exhaust pipe 65, and the third exhaust pipe 66, the cylinder head 14, and the exhaust chamber 53B can be widened. Therefore, the connecting portion of these can be improved in sealing performance.

The intervals between the tubular portions 69a to 69d are formed so as to become narrowest at the central portion between the upstream side end and the downstream side end of the tubular member 69. Therefore, the rigidity of the tubular member 69 further increases, and the number of walls to be formed between the upstream exhaust passages 61 of the cylinders can be reduced, so that the tubular member 69 can be reduced in weight.

Third Preferred Embodiment

Next, a third preferred embodiment of the present invention will be described with reference to FIG. 13 to FIG. 20. In these figures, members identical or equivalent to those described in FIG. 1 to FIG. 12 will be designated with the same reference numerals, and detailed description thereof will be omitted as appropriate.

Figure 13:
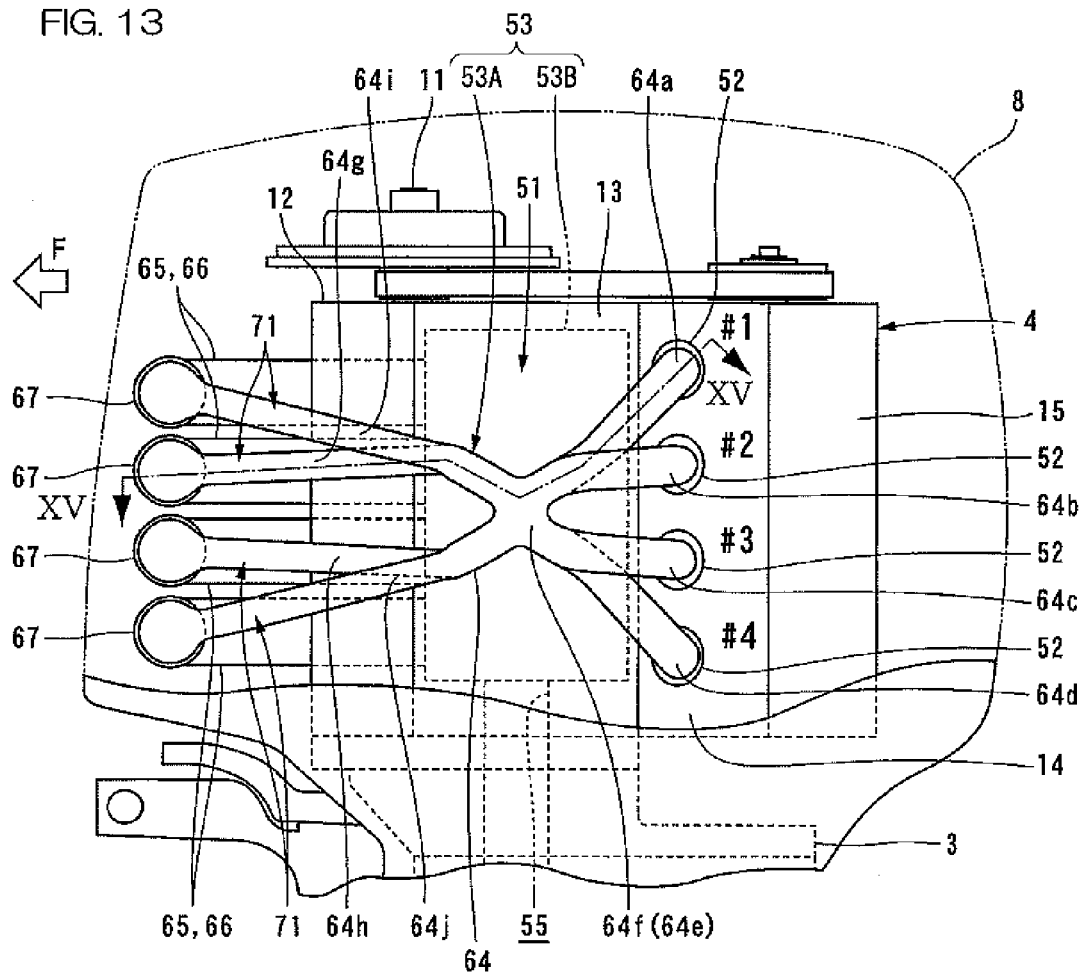
FIG. 13 is an enlarged side view of an engine portion of an outboard motor of a third preferred embodiment of the present invention.
Figure 14:
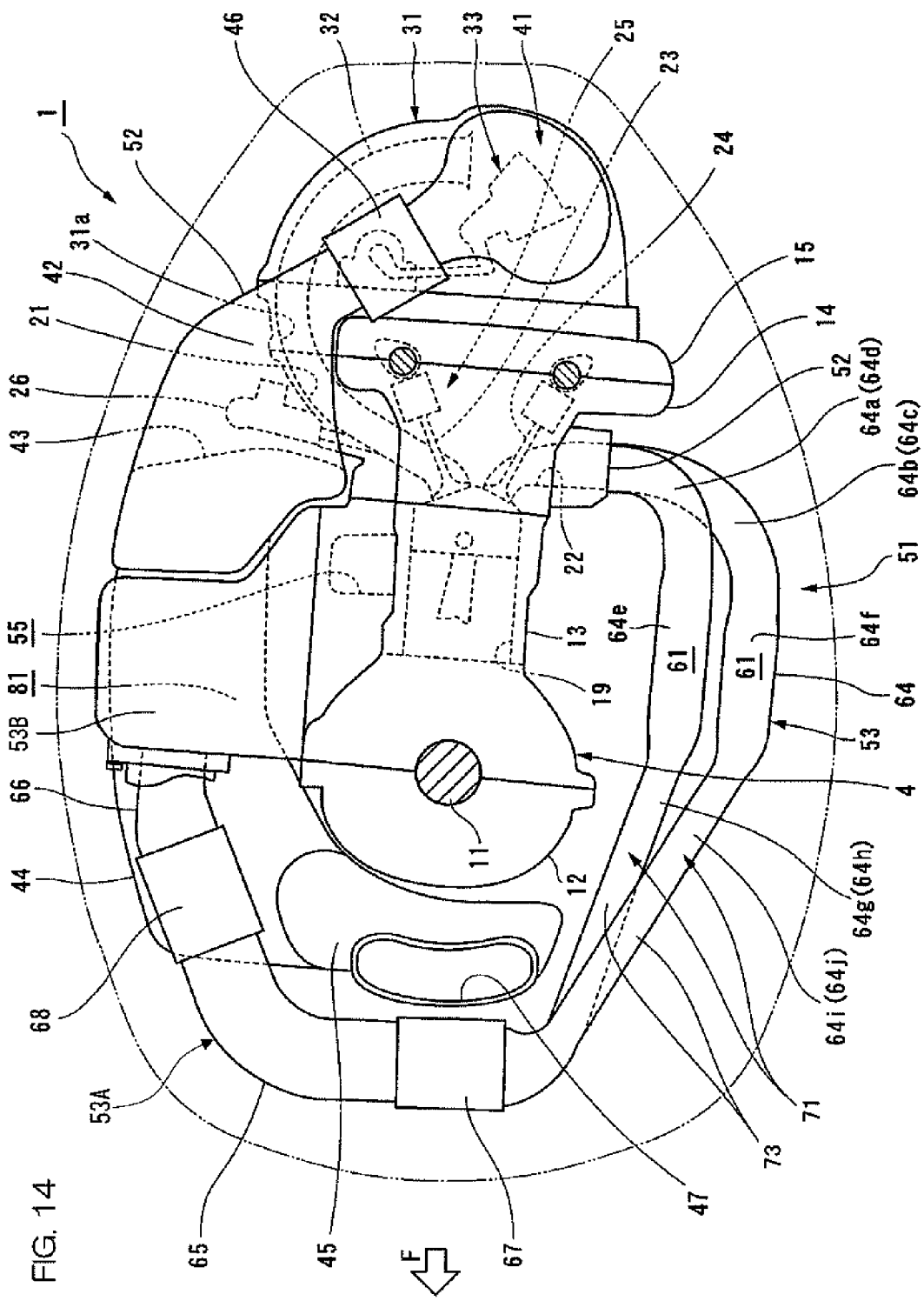
FIG. 14 is an enlarged plan view of the engine portion of the third preferred embodiment of the present invention.

FIG. 13 is an enlarged side view of the engine portion. FIG. 14 is a plan view of the same. In the engine 4, the cylinder 19 positioned highest is the first cylinder #1, and cylinders below this cylinder 19 are the second cylinder #2, the third cylinder #3, and the fourth cylinder #4 in order. As the order of ignition of the engine 4, the first cylinder #1, the third cylinder #3, the fourth cylinder #4, and the second cylinder #2 are ignited in order.

The first exhaust pipe 64 of the bypass exhaust pipe 53A of this preferred embodiment is configured such that the effect of the supersonic nozzle 71 further increases. In FIG. 13 and FIG. 14, the portion (bypass exhaust pipe 53A) of each cylinder positioned on the upstream side of the exhaust chamber 53B in the exhaust pipe 53 is drawn such that only the external form or contour of the upstream exhaust passage 61 is shown.

The first exhaust pipe 64 is formed such that exhaust gases discharged from the exhaust ports 22 at the four points of the cylinder head 14 are collected at two points, and further distributed to four points (four second exhaust pipes 65).

The configuration of the first exhaust pipe 64 will be described in detail by also referring to FIG. 15 which is a sectional view of the bypass exhaust pipe 53A along the cross section XV-XV of FIG. 13. The first exhaust pipe 64 includes four upstream portions 64a to 64d respectively connected to the exhaust ports 22 of the respective cylinders of the cylinder head 14. Further, the first exhaust pipe 64 includes a first collecting portion 64e (see FIG. 14 and FIG. 15) for connecting the outlet end of the first cylinder upstream portion 64a and the outlet end of the fourth cylinder upstream portion 64d to each other. Further, the first exhaust pipe 64 includes a second collecting portion 64f (see FIG. 14 and FIG. 15) for connecting the outlet end of the second cylinder upstream portion 64b and the outlet end of the third cylinder upstream portion 64c. Further, the first exhaust pipe 64 includes first and second downstream portions 64g and 64h branched from the first collecting portion 64e. In addition, the second exhaust pipe 64 includes third and fourth downstream portions 64i and 64j branched from the second collecting portion 64f.

At the first to fourth downstream portions 64g and 64j, as shown in FIG. 15, supersonic nozzles 71 are respectively formed. In this preferred embodiment, the expanding portion 73 of the supersonic nozzle 71 curves toward the center in the width direction of the outboard motor 1 as it goes to the downstream side as shown in FIG. 14. The outlet side ends of the first to fourth downstream portions 64g to 64j are bent toward the center in the width direction of the outboard motor 1.

As most clearly shown in FIG. 14, the first cylinder and fourth cylinder upstream portions 64a and 64d are formed closer to the engine 4 in the width direction of the outboard motor 1 than the second cylinder and third cylinder upstream portions 64b and 64c. Therefore, the first collecting portion 64e is provided at a position closer to the engine 4 than the second collecting portion 64f (upper position in FIG. 15) as shown in FIG. 15.

These first collecting portion 64e and second collecting portion 64f are arranged at substantially the same height as that of the central portion in the up-down direction of the cylinder body 13 as shown in FIG. 13. Accordingly, the pipe length of the first cylinder upstream portion 64a and the pipe length of the fourth cylinder upstream portion 64d can be made equal to each other. The pipe length of the second cylinder upstream portion 64b and the pipe length of the third cylinder upstream portion 64c can be made equal to each other.

Further, the first cylinder upstream portion 64a and the fourth cylinder upstream portion 64d are preferably longer than the second cylinder upstream portion 64b and the third cylinder upstream portion 64c in the side view of FIG. 13. On the other hand, as shown in FIG. 14, the second cylinder upstream portion 64b and the third cylinder upstream portion 64c are formed such that the radius of curvature of the bent portion for connection to the cylinder head 14 is larger than the radius of curvature of the first and fourth cylinder upstream portions 64a and 64d. With this configuration, the first cylinder and fourth cylinder upstream portions 64a and 64d and the second cylinder and third cylinder upstream portions 64b and 64c are formed such that their pipe lengths match each other.

The first and second downstream portions 64g and 64h connected to the first collecting portion 64e extend upward and downward, respectively, as they go to the downstream side (the front of the outboard motor 1, the crank case 12 side in the side view of FIG. 13) from the first collecting portion 64e. These first and second downstream portions 64g and 64h bend toward the front of the outboard motor 1 at positions corresponding to the connecting portion between the crank case 12 and the cylinder body 13 as viewed laterally. The inclination angles of the portions 64g and 64h with respect to the horizontal become smaller at those positions. A portion on the tip side of the bent portion of the first downstream portion 64g, which is positioned higher than the second downstream portion 64h, inclines forward and downward, and extends straight in a side view. A portion on the tip side of the bent portion of second downstream portion 64h positioned lower inclines forward and upward, and extends straight in a side view.

The third and fourth downstream portions 64i and 64j connected to the second collecting portion 64f extend upward and downward, respectively, as they go to the downstream side (forward) from the second collecting portion 64f as shown in FIG. 13. These third and fourth downstream portions 64i and 64j bend such that their inclination angles with respect to the horizontal become smaller than those of the upstream sides at a position corresponding to the connecting portion between the crank case 12 and the cylinder body 13 as viewed laterally. The inclination angles with respect to the horizontal of the portions on the tip sides of the bent portions of these downstream portions are larger than the inclination angles of the first and second downstream portions 64g and 64h with respect to the horizontal. A portion on the tip side of the bent portion of the third downstream portion 64i, which is positioned higher than the fourth downstream portion 64j, inclines forward and upward, and extends straight in the side view. The portion on the tip side of the bent portion of the fourth downstream portion 64i positioned lower inclines forward and downward, and extends straight in the side view.

The outlet end of the third downstream portion 64i is positioned above the outlet end of the first downstream portion 64g. The outlet end of the fourth downstream portion 64j is positioned below the outlet end of the second downstream portion 64h.

The supersonic nozzles 71 are formed at portions assuming straight shapes in the side view of the first and fourth downstream portions 64g and 64j, respectively.

Figure 16A:
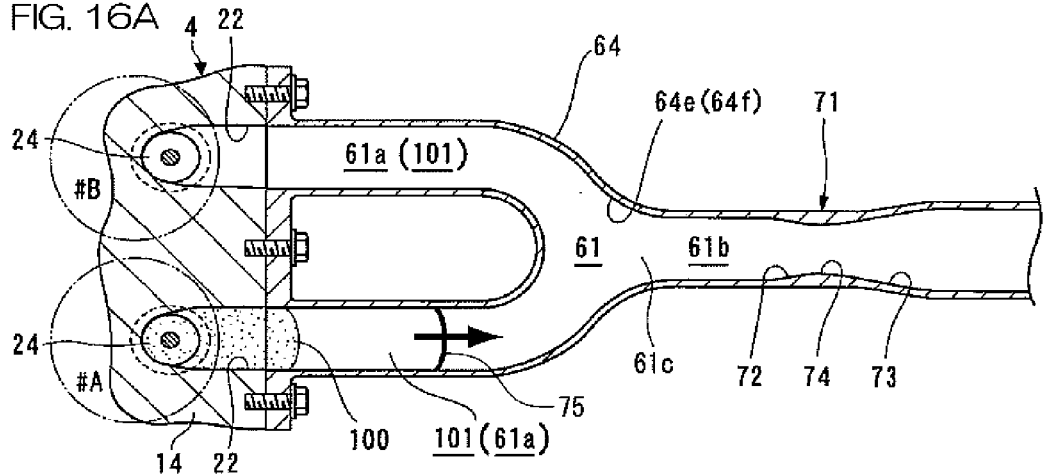
FIG. 16A, FIG. 16B, and FIG. 16C are sectional views for describing advancing states of a shock wave and an exhaust gas.
Figure 16B:
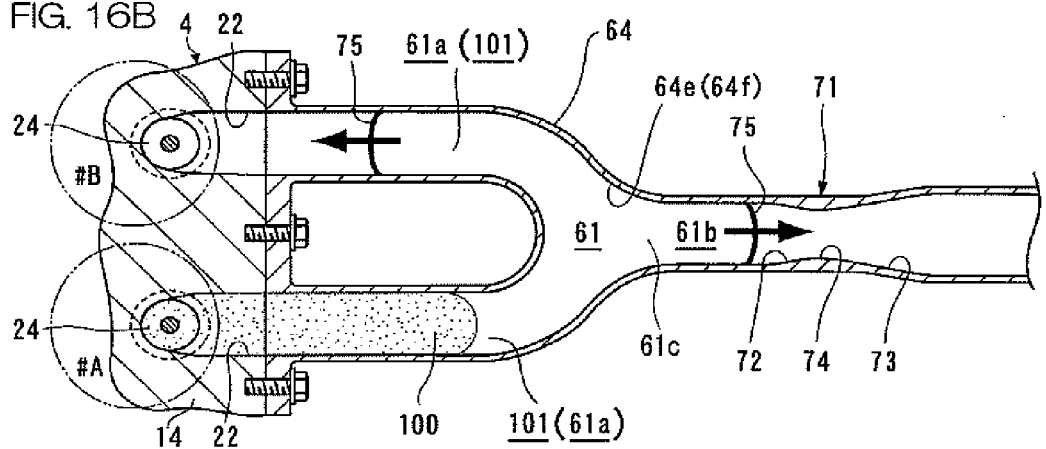
Figure 16C:
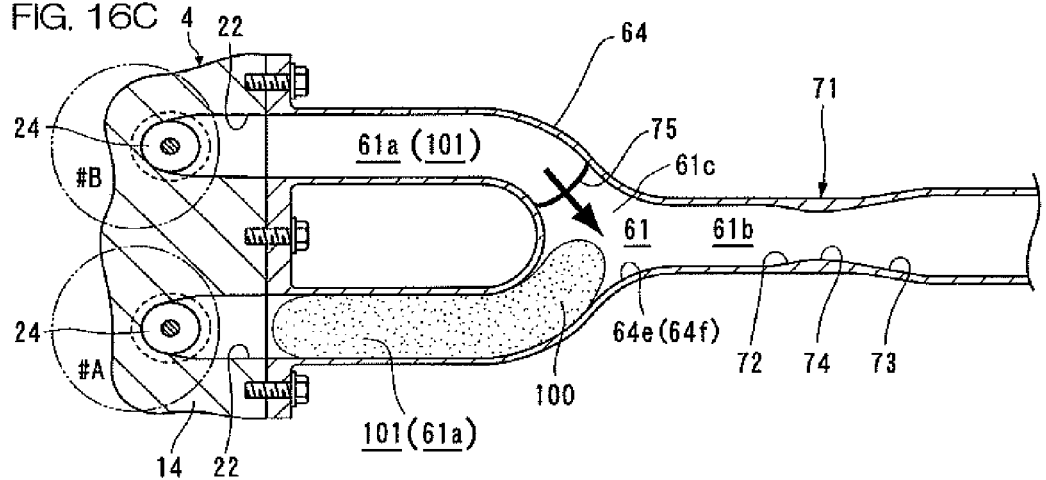

FIG. 16A, FIG. 16B, and FIG. 16C are schematic sectional views for describing configurations of the exhaust passage having the supersonic nozzle 71. In the exhaust device 51 of this preferred embodiment, the exhaust ports 22 and 22 of the two cylinders #A and #B are connected to one supersonic nozzle 71. The two cylinders #A and #B are two cylinders whose exhaust valves 24 open at different periods (without overlapping).

In this preferred embodiment, the engine 4 preferably has four cylinders, so that there are two pairs of cylinders that are corresponding to the pair of cylinders #A and #B. In other words, the first pair consists of the first cylinder #1 and the fourth cylinder whose ignition timing is different by 360 degrees from that of the first cylinder #1. The second pair consists of the second cylinder #2 and the third cylinder #3 whose ignition timing is different by 360 degrees from that of the second cylinder #2.

The two cylinders whose exhaust valves 24 open in different periods have the relationship in which when the exhaust valve of one cylinder 24 is open, an exhaust gas is not discharged from the other cylinder. Therefore, a shock wave 75 which is generated in one cylinder and propagates in the exhaust passage does not interfere with a shock wave 75 which is generated in the other cylinder.

The upstream exhaust passage 61 of the exhaust device 51 has, as shown in FIG. 16, a pair of upstream portions 61a and 61a formed for the respective cylinders and a collecting portion 61c (first collecting portion 64e or second collecting portion 64f) at which these upstream portions are collected. Further, the upstream exhaust passage 61 has a downstream portion 61b connected to the collecting portion 61c. The supersonic nozzle 71 is provided at the downstream portion 61b. In actuality, the two downstream portions 61b are connected to the collecting portion 61c; however, only one is shown in FIG. 16A to FIG. 16C.

In this exhaust device 51, as shown in FIG. 16A to FIG. 16C, a shock wave 75 propagating in the exhaust passage and the upstream portions 61a are used during the exhaust stroke. Accordingly, a condition for making the flow rate of the exhaust gas reach the sonic speed in the supersonic nozzle 71, that is, the condition that the pressure ratio (P/P0) becomes smaller than the critical pressure ratio of about 0.528 is easily satisfied.

In the cylinder #A, when the exhaust valve 24 opens during the exhaust stroke, a combustion gas with a high pressure jets out into the exhaust port 22 from the combustion chamber 10. The flow rate of the combustion gas (exhaust gas) jetting out into the exhaust port 22 increases according to the opening degree of the exhaust valve 24, and reaches the sonic speed before the exhaust valve 24 becomes its full-open state. When the flow rate of the exhaust gas thus reaches the sonic speed, a supersonic shock wave 75 is generated inside the exhaust port 22. At this time, the shock wave 75 advances from the inside of the exhaust port 22 into the first exhaust pipe 64 as shown in FIG. 16A, and further propagates at a high-speed toward the downstream. On the other hand, the exhaust gas 100 advances to the downstream side at a relatively low speed inside the upstream portions 61a behind the shock wave 75.

The shock wave 75 advancing in the first exhaust pipe 64 is branched into the downstream portion 61b and the upstream portion 61a on the cylinder #B side (hereinafter, referred to as "branched passage 101") as shown in FIG. 16B when it passes through the collecting portion 61c, and advances inside the downstream portion 61b and the branched passage 101 independently. The shock wave 75 advancing in the downstream portion 61b passes through the supersonic nozzle 71 and then attenuates and disappears. On the other hand, the shock wave 75 advancing inside the branched passage 101 is reflected by the exhaust valve 24 (closed state) of the cylinder #B, and reverses inside the branched passage 101, and passes through the collecting portion 61c and returns to the exhaust passage on the cylinder #A side.

The branched passage 101 is designed such that the timing at which the shock wave 75 returns to the exhaust passage on the cylinder #A side from the branched passage 101 and the timing at which the exhaust gas 100 with a high-pressure discharged from the cylinder #A and advancing behind the shock wave inside the upstream portion 61a reaches the collecting portion 61c coincide with each other. Accordingly, as shown in FIG. 16C, the shock wave 75 which has propagated inside the exhaust passage on the cylinder #A side from the branched passage 101 and the exhaust gas 100 with a high-pressure inside this exhaust passage collide with each other. In other words, the cross section area and length of the branched passage 101 are dimensionally set such that the shock wave 75 and the exhaust gas 100 thus collide with each other.

Due to the collision between the shock wave 75 and the exhaust gas 100, the total pressure (P0) of the upstream of the inlet of the supersonic nozzle 71 becomes higher. Accordingly, it becomes easy to satisfy the condition that the ratio (P/P0) of the total pressure (P0) of the upstream of the inlet of the supersonic nozzle 71 and the downstream static pressure (P) of the throat portion 74 of the supersonic nozzle 71 becomes smaller than the critical pressure ratio of about 0.528. By satisfying this condition, the exhaust gas 100 flows into the throat portion 74 at a speed over the sonic speed.

Thus, the flow rate of the exhaust gas 100 flowing into the throat portion 74 reaches the sonic speed, and accordingly, the shock wave 75 is regenerated inside the supersonic nozzle 71. Accordingly, as in the case of the first preferred embodiment described above, a negative pressure is generated inside the first exhaust pipe 64, and as a result, the temperature of the exhaust gas inside the first exhaust pipe 64 lowers.

When the cylinder #B is at the time of the exhaust stroke, conversely, the upstream portion 61a including the inside of the exhaust port 22 of the cylinder #A substantially functions as the branched passage 101. In other words, the shock wave 75 generated in the exhaust port 22 of the cylinder #B propagates in the upstream portion 61a (branched passage 101) on the cylinder #A side toward the cylinder #A, and is reflected by the exhaust valve 24 in a closed state. The reflected shock wave 75 propagates in the upstream portion 61a (branched passage 101) on the cylinder #A side toward the collecting portion 61c, and in this collecting portion 61c, collides with the exhaust gas 100 from the cylinder #B. Accordingly, the total pressure (P0) of the upstream of the inlet of the supersonic nozzle 71 rises, and the exhaust gas 100 flowing into the throat portion 74 easily reaches the sonic speed. Accordingly, a shock wave 75 can be caused in the supersonic nozzle 71, and along with this, a negative pressure can be generated inside the first exhaust pipe 64. Thus, the temperature of the exhaust gas generated from the cylinder #B can be lowered.

The first to fourth cylinder upstream portions 64a to 64d in the exhaust pipe 53 preferably have the same predetermined pipe length so as to return a shock wave 75 generated in the exhaust port 22 of another cylinder whose ignition timing is different by 360 degrees to the first or second collecting portions 64e or 64f at an optimum timing. For example, during the exhaust stroke of the first cylinder #1, a shock wave 75 generated in the first cylinder upstream portion 64a propagates from the first collecting portion 64e to the fourth cylinder upstream portion 64d, and is reflected by the fourth cylinder upstream portion 64d and returns to the first collecting portion 64e. The time necessary for this is equal to the time necessary for the shock wave 75 generated in the fourth cylinder upstream portion 64d to be reflected by the first cylinder upstream portion 64a and return to the first collecting portion 64e. This applies to the second cylinder upstream portion 64b and the third cylinder upstream portion 64c.

Thus, the time necessary for the shock wave 75 to return to the first or second collecting portion 64e or 64f is the same among all cylinders. Accordingly, in the supersonic nozzles 71 respectively provided at the first to fourth downstream portions 64g to 64j, the speed of the exhaust gases 100 can be equally increased. As a result, the temperatures of the exhaust gases in all the exhaust passages can be substantially uniformly lowered.

FIG. 17 to FIG. 20 show the results of simulation of the effect of the exhaust device 51 of this preferred embodiment. As a result of verification through simulation, it was found that the exhaust gas pressure and the exhaust gas temperature were significantly lowered inside the supersonic nozzle 71.

Figure 17:
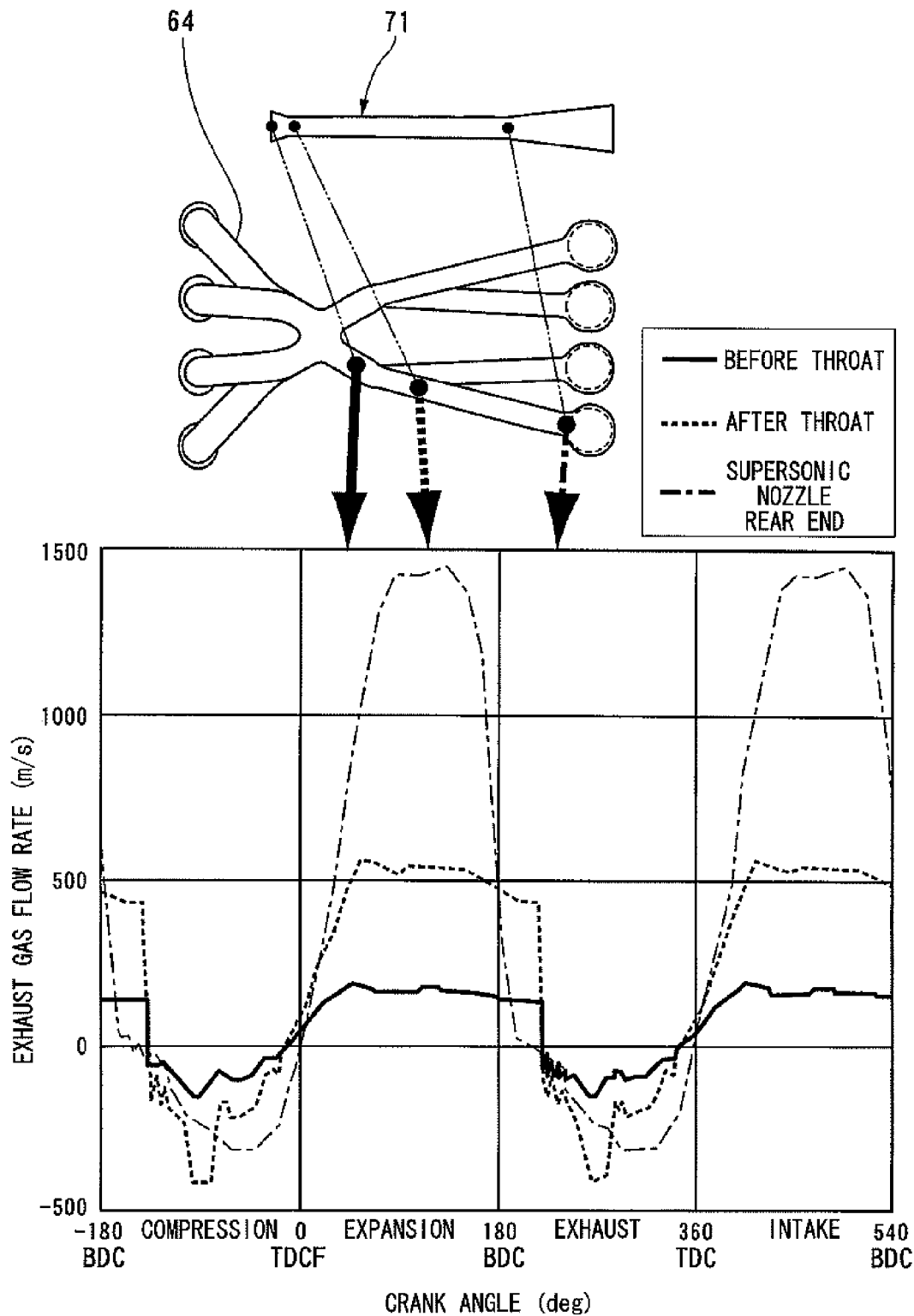
FIG. 17 is a graph showing changes in speed of the exhaust gas inside the supersonic nozzle.

FIG. 17 is a graph showing the relationship between the crank angle and the flow rate of the exhaust gas in the first exhaust pipe 64. In this figure, the solid line shows changes in flow rate of the exhaust gas before the throat portion, and the dashed line shows changes in flow rate of the exhaust gas after the throat portion, and the chain line shows changes in flow rate of the exhaust gas at the rear end of the supersonic nozzle. As is understood from this figure, the shock wave is accelerated from about 570 m/s to about 1450 m/s, for example.

Figure 18:
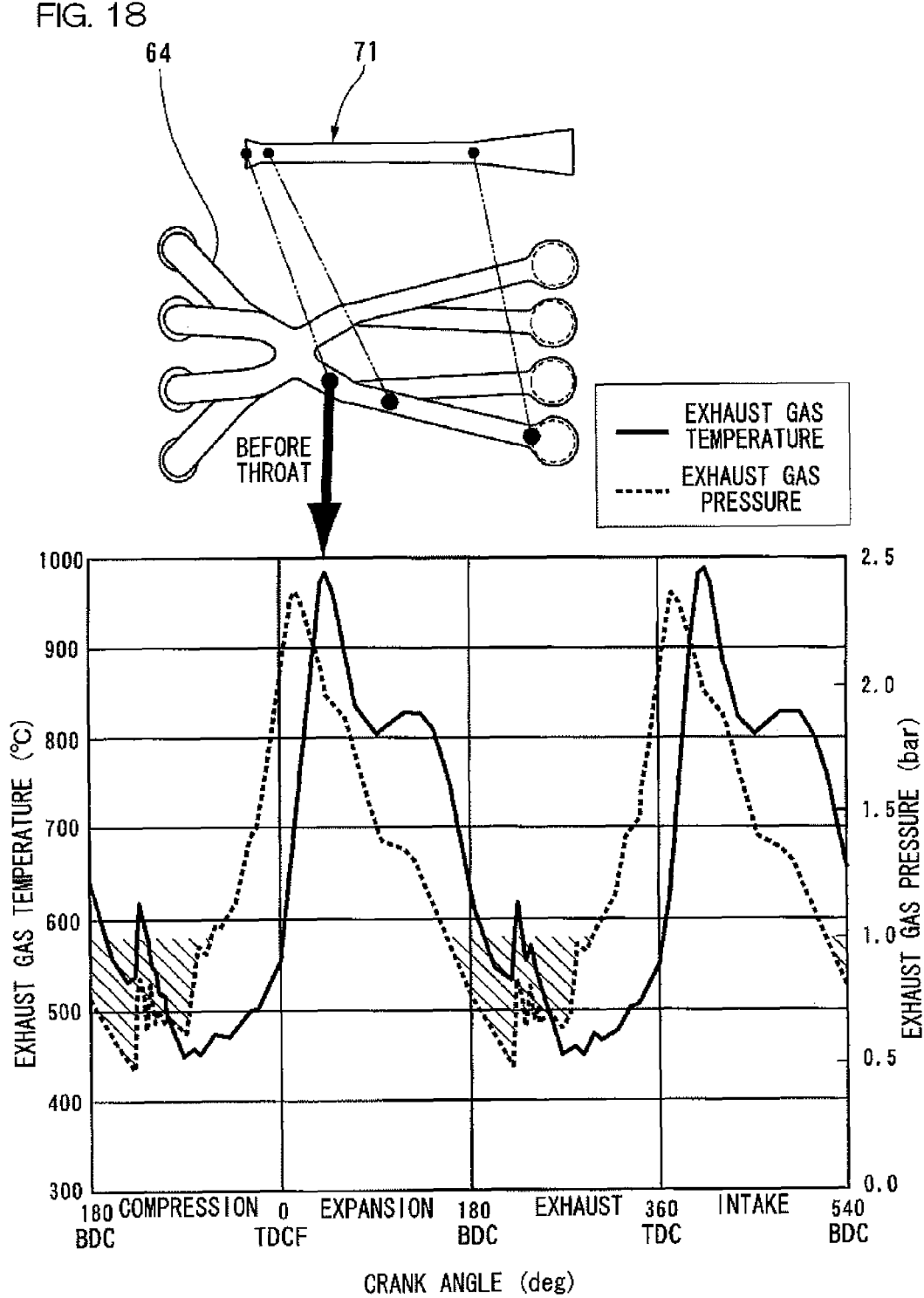
FIG. 18 is a graph showing changes in temperature and pressure of the exhaust gas before the throat.
Figure 19:
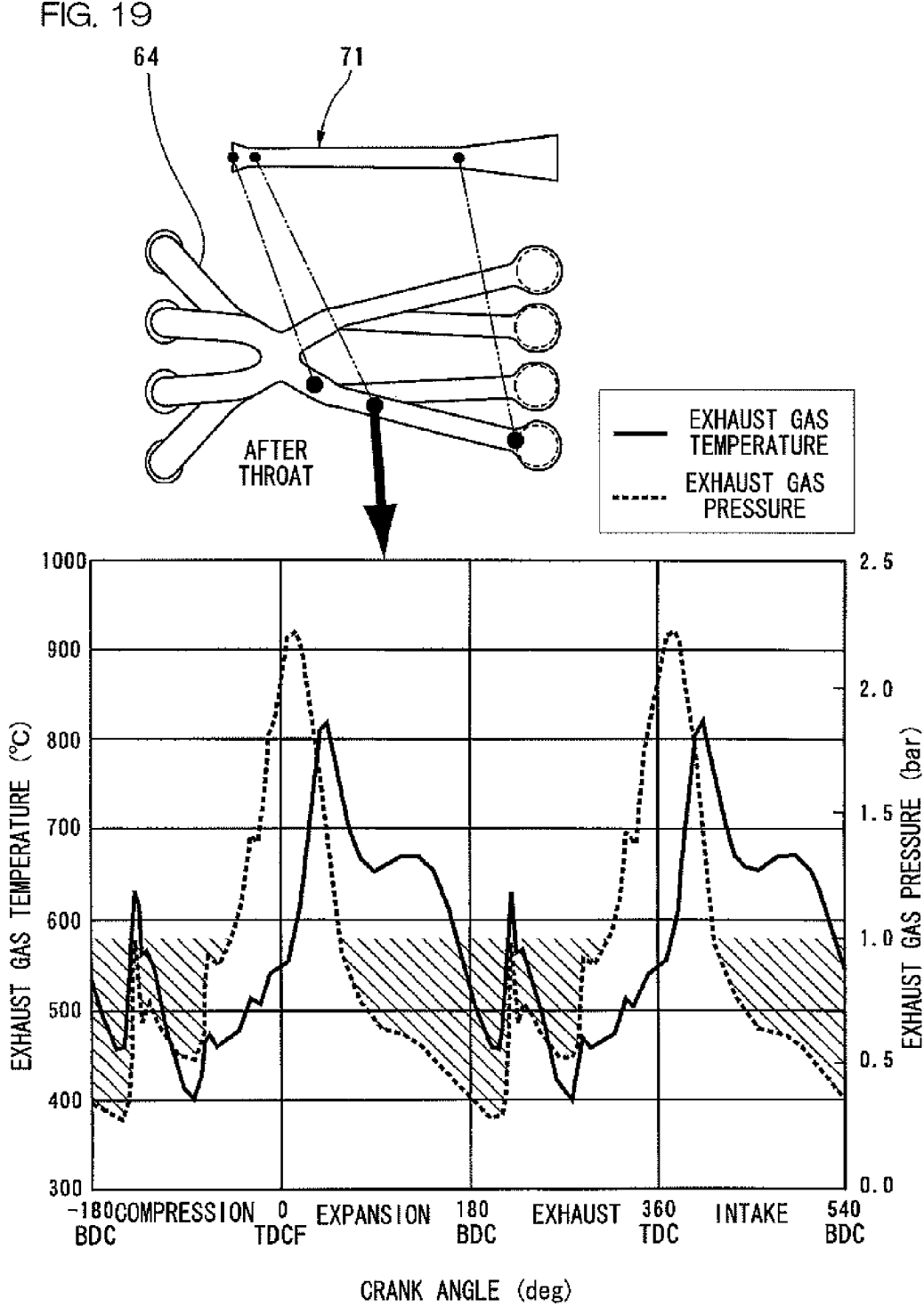
FIG. 19 is a graph showing changes in temperature and pressure of the exhaust gas after the throat.
Figure 20:
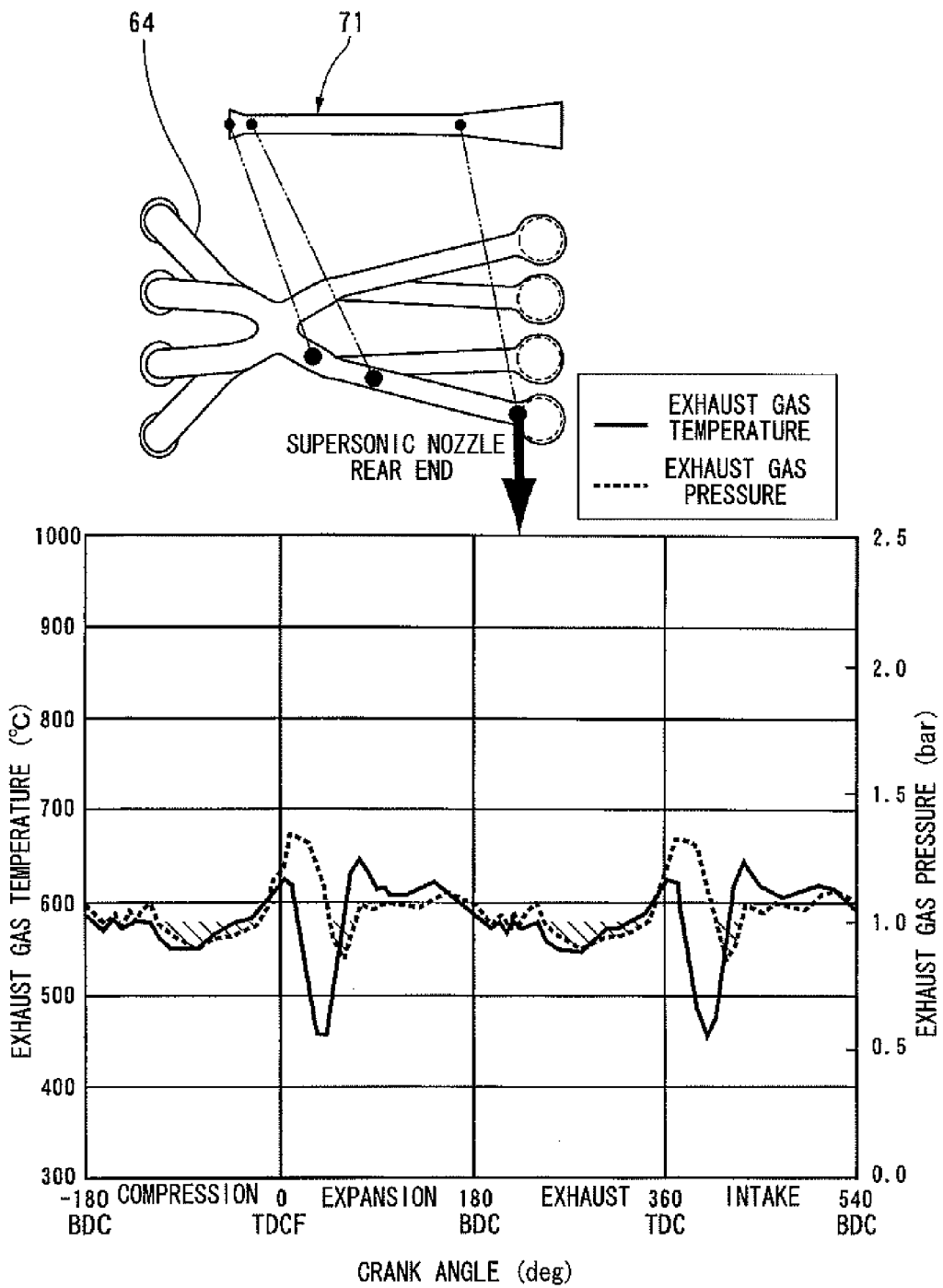
FIG. 20 is a graph showing changes in temperature and pressure of the exhaust gas at the rear end of the supersonic nozzle.

FIG. 18 to FIG. 20 are graphs showing the relationship among the crank angle, the exhaust gas temperature, and the exhaust gas pressure inside the first exhaust pipe 64. FIG. 18 shows changes in exhaust gas temperature and exhaust gas pressure before the throat portion, FIG. 19 shows changes in exhaust gas temperature and exhaust gas pressure after the throat portion, and FIG. 20 shows changes in exhaust gas temperature and exhaust gas pressure at the rear end of the supersonic nozzle. In FIG. 18 to FIG. 20, the period during which the pressure of the exhaust gas is lower than the atmospheric pressure (the inside of the exhaust pipe 53 becomes a negative pressure) is shown by hatching. As is understood from FIG. 18 to FIG. 20, the temperature of the exhaust gas suddenly lowers inside the supersonic nozzle 71 during the exhaust stroke.

The pressure of the exhaust gas, for example, as shown in FIG. 19, becomes negative not only during the exhaust stroke but for a long period. The period during which the negative pressure is thus generated and the temperature of the exhaust gas is lowered is 520 degrees of the crank angle of 720 degrees of the 4-cycle stroke, and this corresponds to 72% of the whole stroke period.

In the exhaust device 51 of this preferred embodiment, two cylinders (the first cylinder #1 and the fourth cylinder #4, and the second cylinder #2 and the third cylinder #3) whose periods during which exhaust valves 24 are open do not overlap each other are paired. When one of the two cylinders of each pair is at the time of the exhaust stroke, the upstream portion 61a of the exhaust passage of the other cylinder is used as the above-described branched passage 101. Therefore, according to this preferred embodiment, the shock wave 75 can be reflected by using the exhaust passage of another cylinder, so that a branched passage which is used exclusively for reflecting the shock wave 75 is not necessary. As a result, in comparison with the exhaust device which has an exclusive branched passage, the branched passage becomes unnecessary, and accordingly, the manufacturing cost of the exhaust device 51 can be reduced.

In the exhaust device 51 of this preferred embodiment, two exhaust pipes (first to fourth downstream portions 64g to 64j) are connected with the downstream side of each of the first and second collecting portions 64e and 64f. Therefore, the exhaust gas discharged from one cylinder is divided in two on the downstream side of the first or second collecting portion 64e or 64f, and respectively flows into the first catalysts 67 arranged in the two downstream portions of 64g to 64j. Therefore, the substantial catalyst cross section area per cylinder is large, so that the exhaust resistance can be reduced. Accordingly, the pressure of the exhaust gas on the upstream side of the catalyst can be lowered.

In this preferred embodiment, two pairs of catalysts each pair of which consists of the first catalyst 67 and the second catalyst 68 are coupled to one cylinder. The exhaust gases are distributed and flowed into these two pairs of catalysts. Therefore, as compared to the case in which all exhaust gases are made to pass through one pair of catalysts, while catalysts with a smaller size (smaller cross section area) are used, the exhaust resistance can be reduced. According to the reduction in exhaust resistance, the exhaust gas pressure on the downstream side of the supersonic nozzle 71 becomes relatively small, so that the exhaust gas can be easily accelerated by the supersonic nozzle 71.

Fourth Preferred Embodiment

Figure 21:
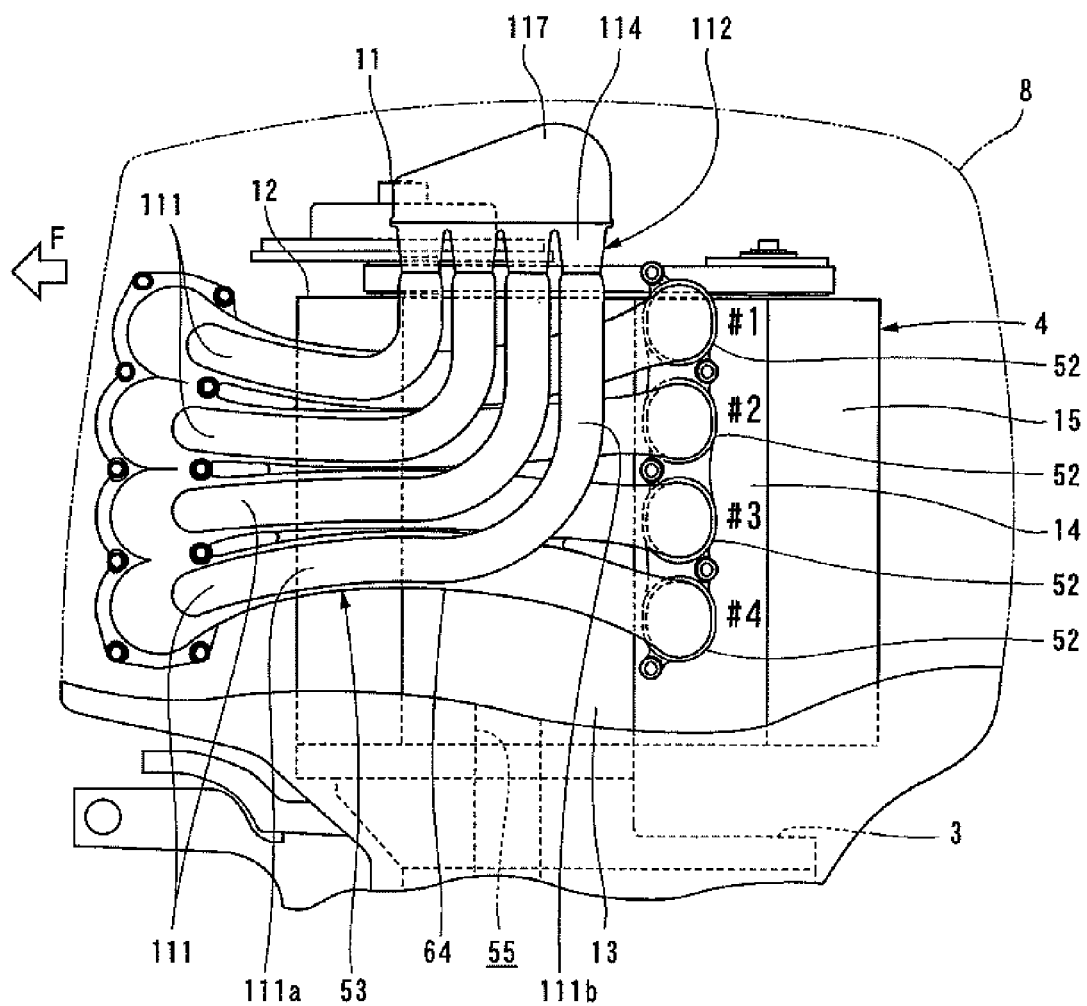
FIG. 21 is a side view of an outboard motor of a fourth preferred embodiment of the present invention, showing a configuration of an exhaust pipe to which a secondary air introducing pipe is connected.
Figure 22:
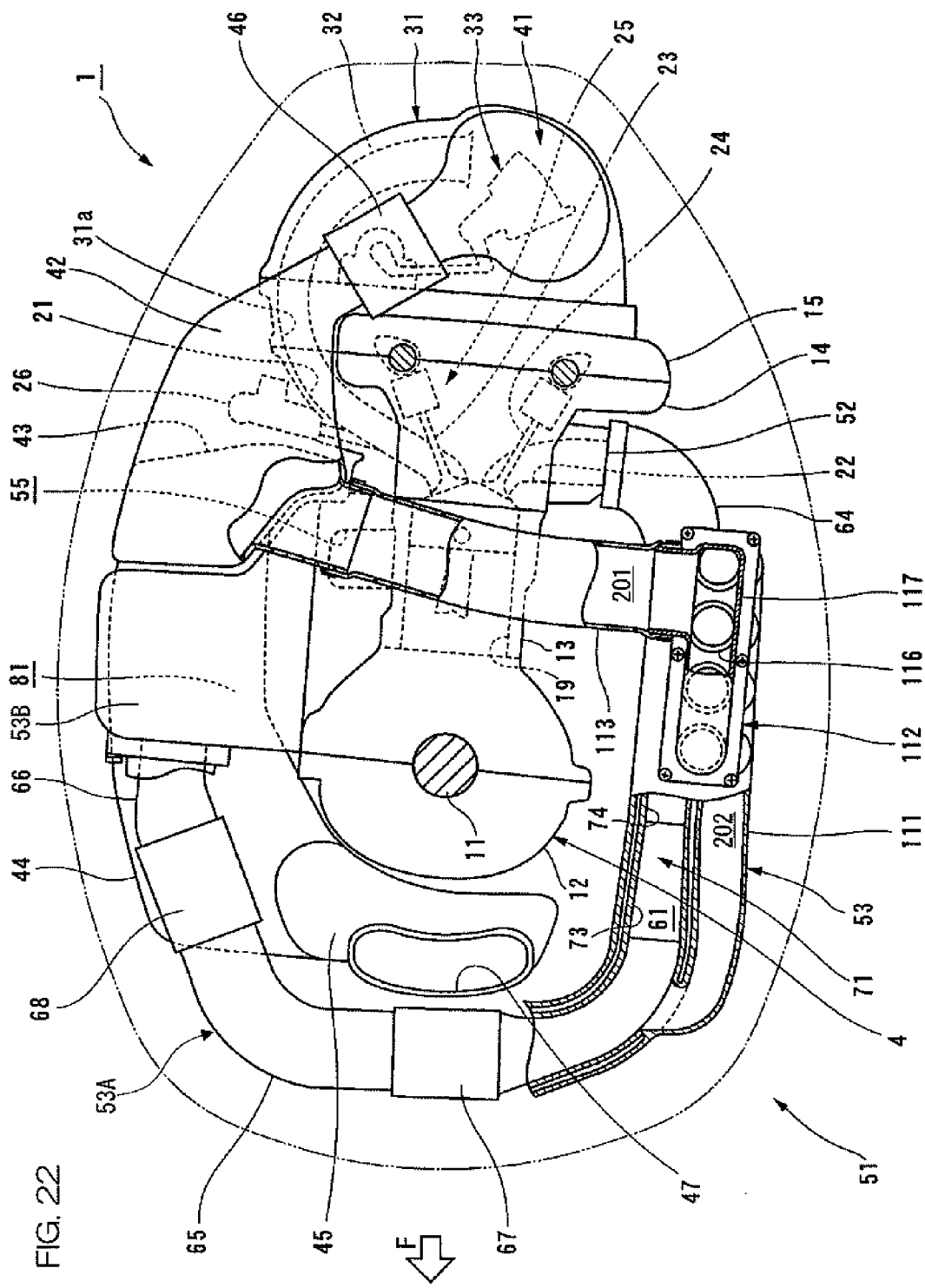
FIG. 22 is a plan view of the outboard motor of the fourth preferred embodiment, showing a configuration of an exhaust pipe to which a secondary air introducing pipe is connected.
Figure 23:
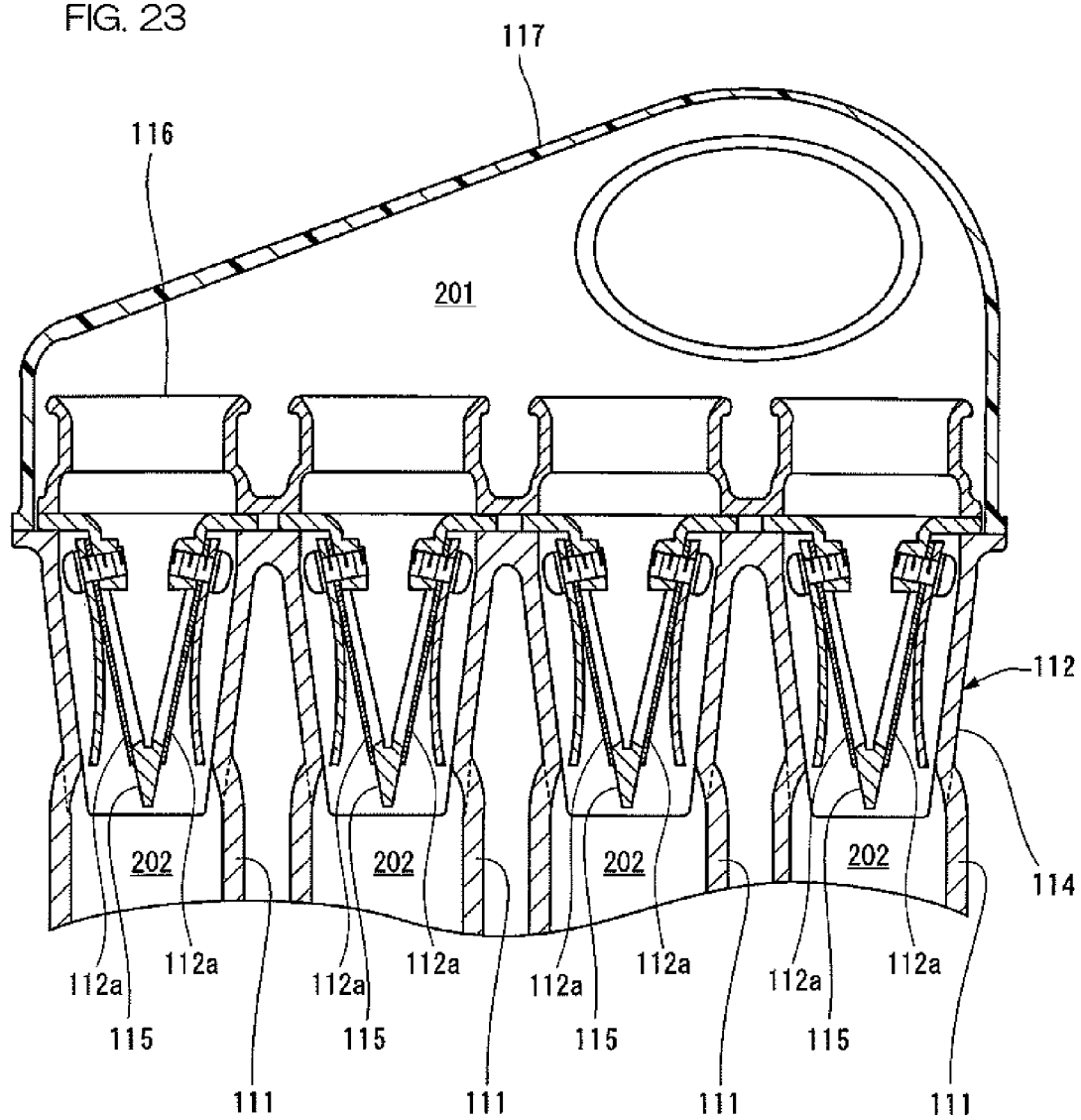
FIG. 23 is a sectional view of reed valves.

An outboard motor 1 of a fourth preferred embodiment of the present invention will be described with reference to FIG. 21 to FIG. 23. In FIG. 21 to FIG. 23, members identical or equivalent to those described in FIG. 1 to FIG. 20 will be designated with the same reference numerals, and detailed description thereof will be omitted as appropriate.

FIG. 21 is a side view of the outboard motor 1, mainly showing the configuration of the exhaust pipe 53. In addition, FIG. 22 is a plan view of the outboard motor 1. To the exhaust pipe 53 of the outboard motor 1, at the outlet side ends of the first exhaust pipes 64, secondary air introducing pipes 111 for the respective cylinders are connected. These secondary air introducing pipes 111 are connected the outlet side ends of the first exhaust pipes 64 on the outer side of the outboard motor (side portion on the opposite side of the engine 4). In the first exhaust pipes 64, supersonic nozzles 71 are provided. The secondary air introducing pipes 111 are connected to the upstream sides of the first catalysts 67 near the downstream sides of the expanding portions 73 of the supersonic nozzles 71 in the first exhaust pipes 64.

The secondary air introducing pipe 111 preferably has a reverse L shape having a horizontal portion 111a and a vertical portion 111b. The horizontal portion 111a extends in the front-rear direction (direction in which the crank case 12, the cylinder body 13, and the cylinder head 14 are lined up) of the outboard motor 1 along the first exhaust pipe 64. From the rear end (upstream side end) of this horizontal portion 111a, the vertical portion 111b extends upward. In this preferred embodiment, four first exhaust pipes 64 and four secondary air introducing pipes 111 are preferably formed integrally by casting.

The upper ends of the secondary air introducing pipes 111 are preferably positioned at substantially the same height as the upper end of the cylinder body 13 as shown in FIG. 21. These upper ends are connected to the intake duct 41 via the reed valves 112 provided for the respective cylinders and one communicating pipe 113 as shown in FIG. 22.

The communicating pipe 113 is preferably formed of one pipe, and as shown in FIG. 22, the pipe 113 crosses the width direction of the outboard motor 1, that is, crosses the direction in which the crank case 12 and the cylinder body 13 are lined up in a plan view above the engine 4. The communicating pipe 113 connects the cover 117 and the upper end of the intake duct 41. A position to which the communicating pipe 113 is connected in the intake duct 41 is the connecting portion between the downstream side vertical portion 43 and the downstream side horizontal portion 42. The passage formed of the secondary air introducing pipes 111, the reed valves 112, and the communicating pipe 113 defines a secondary air introducing passage.

This secondary air introducing passage is formed of one upstream side introducing portion 201 and downstream side introducing portions 202 provided for the respective cylinders. The upstream side introducing portion 201 is preferably formed of one communicating pipe 113 led out from the intake duct 41. The downstream side introducing portion 202 is formed of the secondary air introducing pipe 111 which is branched from the upstream side introducing portion 201 via the reed valve (check valve) 112 provided for each cylinder. The outlet end of the secondary air introducing pipe 111 is connected to the upstream exhaust passage 61 of each cylinder.

The reed valve 112 is provided for preventing the exhaust gas from flowing into the intake system from the secondary air introducing pipe 111. In the reed valve 112, when a negative pressure is generated inside the first exhaust pipe 64, the valve body 112a (see FIG. 23) opens and makes only secondary air flow to the secondary air introducing pipe 111 side from the intake duct 41 side.

FIG. 23 is a sectional view for describing the configuration of the reed valves 112. The reed valve 112 has a valve housing 114 which is formed integrally with each of the four secondary air introducing pipes 111 and opens upward. The reed valve 112 further has a reed valve main body 115 and a passage forming member 116 for each cylinder attached to the valve housing 114 from above. The reed valves 112 have a cover 117 forming one air passage which is shared by all the cylinders, in cooperation with the four valve housings 114. The reed valve 112 is arranged lateral to the engine 4 (left side in the width direction of the outboard motor 1) above the first exhaust pipe 64 as shown in FIG. 21 and FIG. 22.

Generally, the outboard motor is mostly used for a long-time in an operating state in which the output of the engine is maximum. In such an operating state, when the air-fuel ratio during engine operation (hereinafter, this air-fuel ratio will be referred to as "combustion air-fuel ratio") is set to a theoretical air-fuel ratio to improve the exhaust gas purifying efficiency of the catalysts, the combustion temperature becomes excessively high. Accordingly, problems such as melting of the piston and deterioration of the valve seat may occur.

Therefore, during high-load high rotation of the engine 4, in order to cool the members inside the combustion chamber by vaporization heat of the fuel, the air-fuel ratio during operation of the engine 4 is set to the richer side than the theoretical air-fuel ratio in many cases.

According to this preferred embodiment, when the insides of the first to third exhaust pipes 64 to 66 become negative pressures, secondary air is suctioned into the first exhaust pipe 64 from the secondary air introducing pipe 101. Accordingly, while high purifying efficiency of the catalysts 67 and 68 is maintained, the combustion temperature can be lowered by setting the combustion air-fuel ratio to the richer side than the theoretical air-fuel ratio. In other words, the exhaust gas and the secondary air flow to the catalysts 67 and 68, so that even if oxygen in the exhaust gas is short due to the richer combustion air-fuel ratio, supplemental oxygen can be supplied by the secondary air. Therefore, even when the combustion air-fuel ratio is set to the richer side than the theoretical air-fuel ratio, toxic components in the exhaust gas can be sufficiently purified by the catalysts 67 and 68.

Therefore, while the state in which a clean exhaust gas is discharged is maintained, the combustion temperature can be lowered by setting the combustion air-fuel ratio to the richer side than the theoretical air-fuel ratio. As a result, the inside of the upstream exhaust passage 61 becomes a negative pressure and the amount of exhaust gas remaining inside the cylinder 19 of the engine 4 is reduced, and in addition, by making richer the combustion air-fuel ratio, the combustion temperature can be lowered. Accordingly, an occurrence of abnormal combustion such as self-ignition and knocking in the engine 4 can be more reliably prevented.

By setting the combustion air-fuel ratio to the richer side than the theoretical air-fuel ratio, the members inside the combustion chamber can be cooled by the vaporization heat of the fuel. Therefore, according to this preferred embodiment, the inner surface of the combustion chamber is cooled by the fuel, so that problems caused by excessive temperature rise inside the combustion chamber, that is, melting of the piston and deterioration of the valve seat, can be prevented.

It is known that the pressure inside the first exhaust pipe 64 becomes negative due to exhaust pulsation propagating inside the exhaust pipe 53 without using the supersonic nozzle 71. In addition, in the preferred embodiment shown in FIG. 21 to FIG. 23, the exhaust passage is formed for each cylinder in the first exhaust pipe 64, so that the exhaust pulsation is not attenuated by interference with exhaust pulsations of other cylinders. Therefore, secondary air can be introduced by effectively using the negative pressure.

The temperature of the secondary air is substantially the temperature of the atmosphere, and is much lower than the temperature of the exhaust gas. Therefore, according to this preferred embodiment, the temperature of the exhaust gas can be lowered by the large amount of secondary air at the relatively low temperature introduced into the upstream exhaust passage 61. Accordingly, at the catalysts 67 and 68, an occurrence of the sintering phenomenon described above can be more reliably prevented.

Further, in this preferred embodiment, the upstream portion of the secondary air introducing passage is connected to the intake duct 41 via the reed valves 102. Therefore, intake noise caused by suctioning of the air into the secondary air introducing passage and seating noise caused when the valve bodies 102a of the reed valves 102 seat on the valve seats can be reduced by the intake duct 41. Therefore, noise caused from the secondary air introducing passage can be reduced.

Further, the secondary air introducing passage includes one upstream introducing portion 111 led out from the intake duct 41, and downstream side introducing portions 112 which are branched from the upstream side introducing portion 111 via the reed valves 102 for the cylinders. The downstream side introducing portions 112 have downstream ends connected to the upstream exhaust passages 61 of the respective cylinders. Therefore, the secondary air introducing passages (downstream side introducing portions 112) of the cylinders are collected into one passage (upstream side introducing portion 111) on the upstream side of the reed valves 102, and the one passage is connected to the intake duct 41 side. As a result, the capacity of the upstream side introducing portion 111 can be set to be large, so that secondary air is easily suctioned into each reed valve 102.

The intake duct 41 to which the secondary air introducing passage is connected is formed into a U shape (see FIG. 5) extending from the upper end to the lower end of the engine 4 in a side view. Therefore, even if water entering inside the engine cover 8 is suctioned into the intake duct 41 together with intake air, the water can be prevented from entering so as not to cause problems. The intake air flowing into the air suction port 47 of the intake duct 41 lowers inside the upstream side vertical portion 45 and collides with the bottom or the wall around the bottom of the upstream side horizontal portion 44 and changes its direction, and rises inside the downstream side vertical portion 43. Accordingly, entry of water can be prevented.

In other words, even when the outboard motor 1 is used at sea and seawater is suctioned into the intake duct 41 together with intake air, seawater adheres to the bottom or the wall around the bottom of the upstream side horizontal portion 44, and accordingly, the amount of seawater contained in the intake air can be reduced. By thus reducing the amount of seawater contained in the intake air, although this intake air is introduced into the exhaust passage as secondary air, the catalysts 67 and 68 can be protected from corrosion caused by the salt content in seawater.

Further, in this preferred embodiment, the supersonic nozzle 71 is formed in the first exhaust pipe 64, and the secondary air introducing pipe 111 is connected to the first exhaust pipe 64. In the upstream exhaust passage 61 inside the first exhaust pipe 64, as in the exhaust device 51 shown in FIG. 1 to FIG. 12, a high negative pressure is generated due to the operation of the supersonic nozzle 71. By this high negative pressure, more secondary air can be introduced into the first exhaust pipe 64 (upstream exhaust passage 61). The secondary air introducing pipe 111 does not obstruct generation of the negative pressure by reflecting the shock wave generated in the supersonic nozzle 71. This is so because the secondary air introducing pipe 111 is connected to a portion near the downstream side of the expanding portion 73 in the first exhaust pipe 64, the portion which the cross section area of the exhaust passage becomes much larger than at other portions. The shock wave generated in the supersonic nozzle 71 has already attenuated until reaching this connecting portion.

The phenomenon in which a negative pressure is generated inside the upstream exhaust passage 61 by the supersonic nozzle 71 continuously occurs even when the speed of the engine 4 becomes higher than the engine speed of the maximum output. In a general engine, in the high-speed operation range, the pressure of the exhaust gas becomes relatively high, so that the secondary air suction amount is greatly reduced. However, according to this preferred embodiment, a high negative pressure is generated inside the upstream exhaust passage 61 even in the high-speed operation range, so that secondary air can be sufficiently introduced into the exhaust passage. As a result, without using an air pump for forcibly blowing secondary air into the exhaust passage, a sufficient supply amount of secondary air, as much as the supply amount in the case in which such an air pump is adopted, can be actively introduced into the upstream exhaust passage 61.

In the exhaust pipe 53 of this preferred embodiment, the exhaust gas discharged from the cylinder head 14 can also be made to flow so as to whirl in one direction around the engine 4 in a plan view.

Fifth Preferred Embodiment

An outboard motor 1 of a fifth preferred embodiment of the present invention will be described with reference to FIG. 24 and FIG. 25. In these figures, members identical to or equivalent to those described in FIG. 1 to FIG. 23 will be designated with the same reference numerals, and detailed description thereof will be omitted as appropriate.

Figure 24:
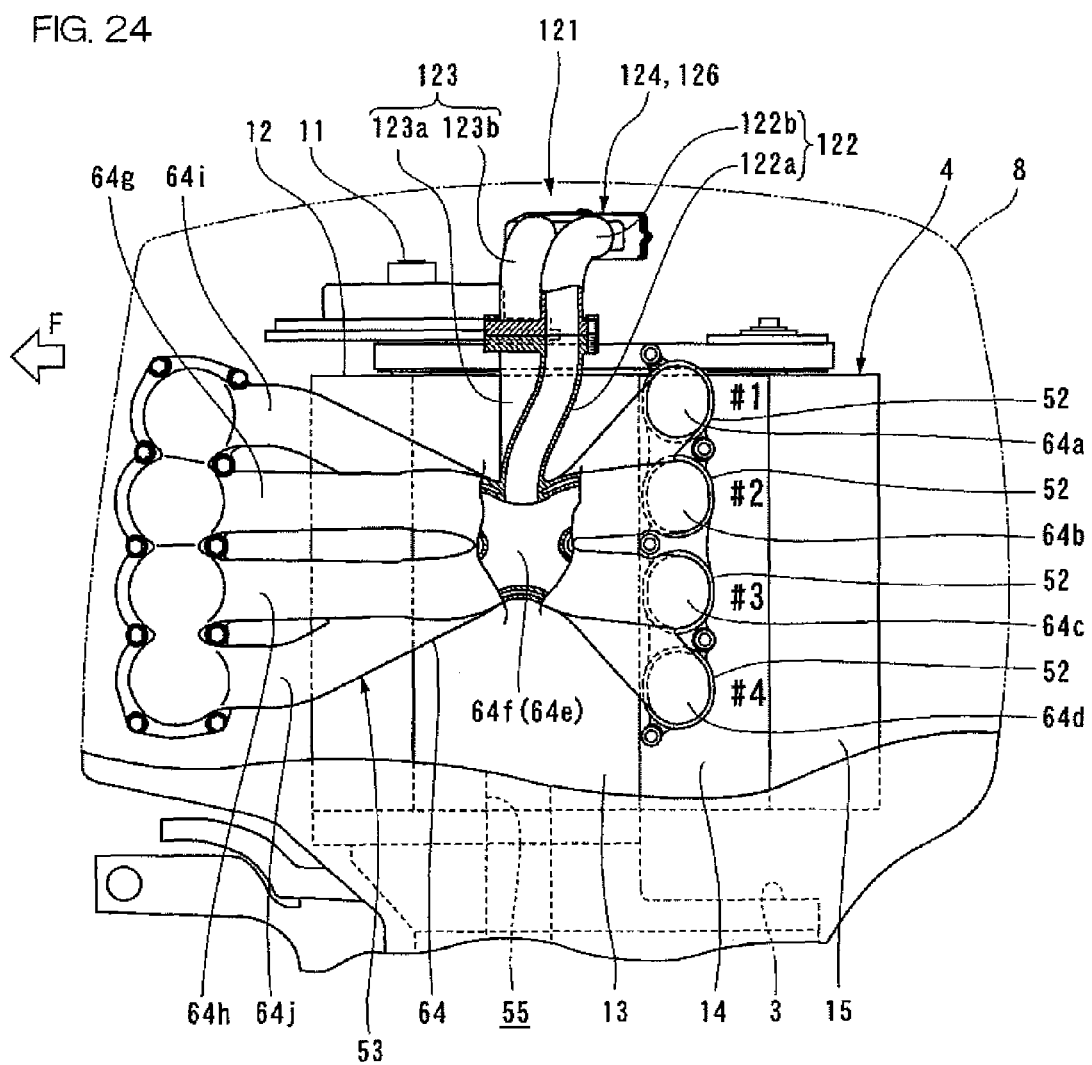
FIG. 24 is a side view of an outboard motor of a fifth preferred embodiment of the present invention, showing an exhaust pipe to which a secondary air introducing pipe is connected.

FIG. 24 is a side view of the outboard motor 1, and mainly shows a configuration of the exhaust pipe 53. In addition, FIG. 25 is a plan view of the outboard motor 1. In the exhaust pipe 53 of the outboard motor 1 shown in FIG. 24 and FIG. 25, a secondary air introducing pipe 121 is connected to the first exhaust pipe 64 used in the preferred embodiment shown in FIG. 13 to FIG. 20. The first exhaust pipe 64 is formed such that secondary air is respectively introduced into the first collecting portion 64e and the second collecting portion 64f from the secondary air introducing pipe 121.

The secondary air introducing pipe 121 preferably includes a first secondary air introducing pipe 122 and a second secondary air introducing pipe 123. The first secondary air introducing pipe 122 extends in the up-down direction, and the lower end thereof is connected to the first collecting portion 64e. The second secondary air introducing pipe 123 extends in the up-down direction, and the lower end thereof is connected to the second collecting portion 64f.

The first secondary air introducing pipe 122 is connected to the intake duct 41 via a first reed valve 124 and a first communicating pipe 125. The second secondary air introducing pipe 123 is connected to the intake duct 41 via a second reed valve 126 and a second communicating pipe 127. The first and second reed valves 124 and 126 open when a negative pressure is generated inside the first exhaust pipe 64, and allows only secondary air flow to the side of the first and second secondary air introducing pipes 122 and 123 from the intake duct 41 side.

The first and second secondary air introducing pipes 122 and 123 include lower portions 122a and 123a preferably formed by casting integrally with the first exhaust pipe 64, and upper portions 122b and 123b attached to the upper ends of the lower portions. The upper portions 122b and 123b are bent so as to extend across the engine 4 in the width direction of the outboard motor 1 (direction crossing the direction in which the crank case 12 and the cylinder body 13 are lined up in a plan view) above the engine 4 as shown in FIG. 25. On the upper portion 122b of the first secondary air introducing pipe 122, a valve housing 124a of the first reed valve 124 is formed integrally. On the upper portion 123b of the second secondary air introducing pipe 123, a valve housing 126a of the second reed valve 126 is formed integrally.

Figure 25:
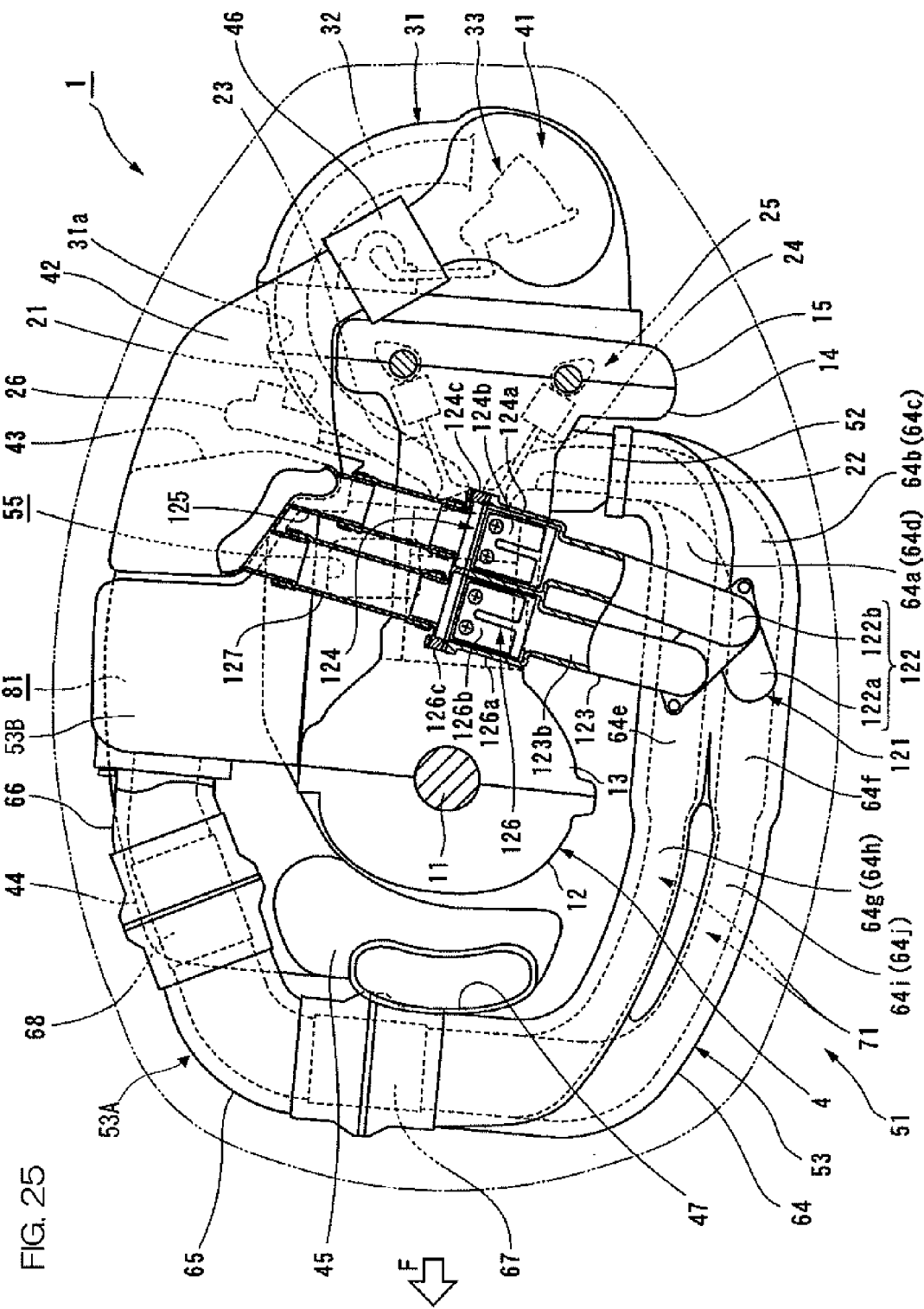
FIG. 25 is a plan view of the outboard motor of the fifth preferred embodiment, showing an exhaust pipe to which a secondary air introducing pipe is connected.

The first and second reed valves 124 and 126 include, as shown in FIG. 25, valve housings 124a and 126a, reed valve main bodies 124b and 126b inserted in the valve housings, and covers 124c and 126c which form air passages in cooperation with the valve housings. The cover 124c of the first reed valve 124 is connected to the first communicating pipe 125, and the cover 126c of the second reed valve 126 is connected to the second communicating pipe 127.

Even when the exhaust pipe 53 shown in FIG. 24 and FIG. 25 is used, the same effect can be obtained as in the case in which the exhaust pipe 53 shown in FIG. 21 to FIG. 23 is used. In the exhaust pipe 53 (bypass exhaust pipe 53A) of this preferred embodiment, the exhaust gas discharged from the cylinder head 14 can also be made to flow so as to whirl in one direction around the engine 4 in a plan view.

Sixth Preferred Embodiment

An outboard motor 1 of a sixth preferred embodiment of the present invention will be described with reference to FIG. 26 and FIG. 27. In these figures, members identical to or equivalent to those described in FIG. 1 to FIG. 25 will be designated with the same reference numerals, and detailed description thereof will be omitted as appropriate.

Figure 26:
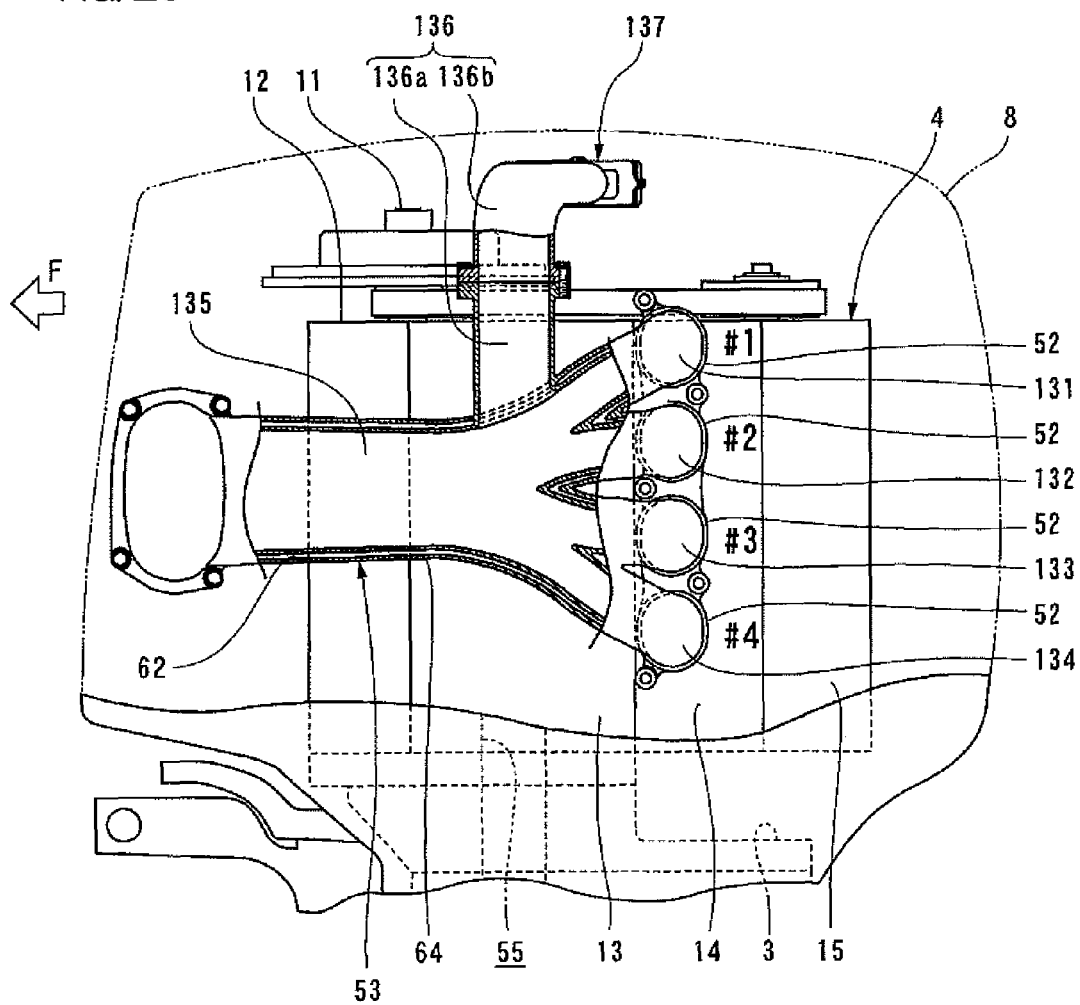
FIG. 26 is a side view of an outboard motor of a sixth preferred embodiment of the present invention, showing an exhaust pipe to which a secondary air introducing pipe is connected.
Figure 27:
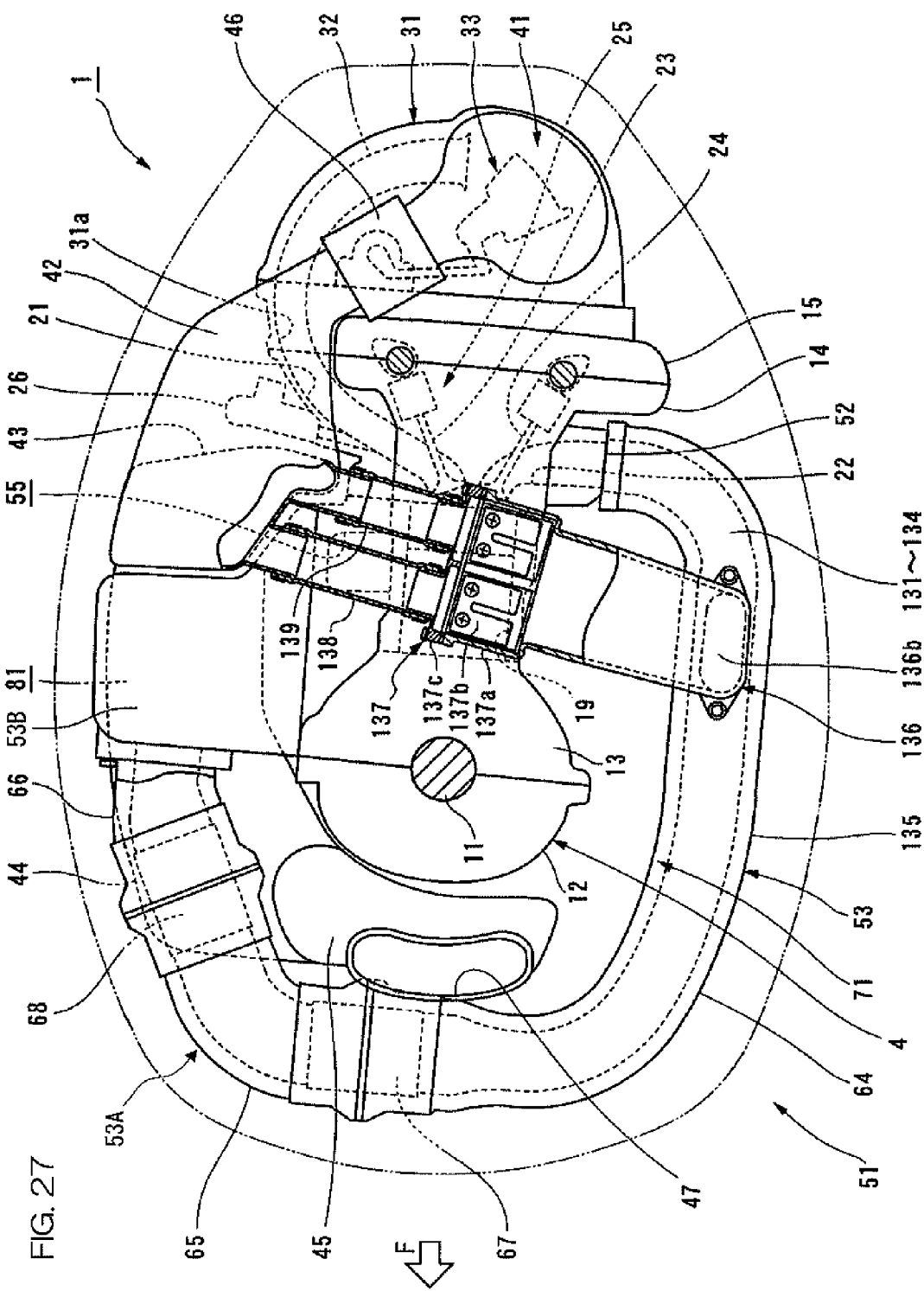
FIG. 27 is a plan view of the outboard motor of the sixth preferred embodiment, showing an exhaust pipe to which a secondary air introducing pipe is connected.

FIG. 26 is a side view of the outboard motor 1, and mainly shows a configuration of the exhaust pipe 53. In addition, FIG. 27 is a plan view of the outboard motor 1. The first exhaust pipe 64 of the exhaust pipe 53 shown in FIG. 26 and FIG. 27 is formed such that exhaust gases in all cylinders are collected at one point. In other words, this first exhaust pipe 64 preferably includes upstream portions 131 to 134 provided for the respective cylinders to be connected to the exhaust gas outlets 52 of the cylinders, and a downstream portion 135 formed by collecting these upstream portions together.

The upstream portions 131 to 134 incline toward the central portion in the up-down direction of the cylinder body 13 from the exhaust gas outlets 52 of the respective cylinders in a side view as shown in FIG. 26. On the connecting portion between the upstream portion 131 positioned highest among the upstream portions 131 to 134 and the downstream portion 135, the lower portion 136a of the secondary air introducing pipe 136 is preferably formed integrally by casting. This lower portion 136a extends upward from the connecting portion.

The secondary air introducing pipe 136 preferably includes the lower portion 136a and an upper portion 136b attached to the upper side of the lower portion 136a. The upper portion 136b is bent at the intermediate portion in the longitudinal direction such that the downstream side thereof extends across the engine 4 in the width direction of the outboard motor 1 (direction crossing the direction in which the crank case 12 and the cylinder body 13 are lined up in a plan view) above the engine 4 as shown in FIG. 27. The downstream side of the upper portion 136b is connected to the intake duct 41 via the reed valve 137 and two communicating pipes 138 and 139.

The reed valve 137 includes a valve housing 137a formed integrally with the upper portion 136b, a reed valve main body 137b inserted in the valve housing 137a, and a cover 137c which forms an air passage in cooperation with the valve housing 137a. The cover 137c is connected to the downstream side ends of the communicating pipes 138 and 139.

The downstream portion 135 of the first exhaust pipe 64 is formed such that the width thereof in the up-down direction becomes larger than the width in the width direction (front and rear direction at the front end) of the outboard motor 1. The formation of the downstream portion 135 to make the sectional shape of the exhaust passage vertically long is to secure a wide passage cross section area of the downstream portion 135 by effectively utilizing the space formed between the engine 4 and the engine cover 8.

The downstream portion of the first exhaust pipe 64 is formed to assume one pipe, so that the second exhaust pipe 65 and the third exhaust pipe 66 of the bypass exhaust pipe 53A are formed of one pipe each. Therefore, in the exhaust pipe 53, one first catalyst 67 and one second catalyst 68 are provided. The second and third exhaust pipes 65 and 66 and the first and second catalysts 67 and 68 are formed such that the sectional shape of the exhaust passage becomes vertically long similar to the first exhaust pipe 64.

In the exhaust pipe 53 (bypass exhaust pipe 53A) of this preferred embodiment, the exhaust gas discharged from the cylinder head 14 can also be made to flow so as to whirl in one direction around the engine 4 in a plan view.

Preferred embodiments of the present invention are described in detail above, and these are merely detailed examples used for making clear the technical content of the present invention, and the present invention should not be construed as being limited to these detailed examples, and the spirit and scope of the present invention are limited only by the appended claims.

The present application corresponds to Japanese Patent Application No. 2008-173153 and Japanese Patent Application No. 2008-177633 filed on Jul. 2, 2008 and Jul. 8, 2008 to the Japan Patent Office, and whole disclosures of these applications are incorporated herein by reference.

What is claimed is:

1. An outboard motor comprising:
an engine including a crank case, a cylinder body, and a cylinder head that are aligned along a front-rear direction of the outboard motor, the crank case is disposed closer to a frontmost portion of the outboard motor than the cylinder body and the cylinder head, and the crank case and the cylinder body support a crankshaft extending along an up-down direction of the outboard motor; and
an exhaust pipe that leads an exhaust gas of the engine to a main exhaust passage positioned below the engine; wherein
the cylinder head includes an exhaust gas outlet opened in a side portion of the cylinder head on a first side in a left-right direction of the outboard motor; and
the exhaust pipe includes a bypass exhaust pipe which, in a plan view, extends from the exhaust gas outlet, circumvents the engine alongside the crank case so as to be disposed between the crank case and the frontmost portion of the outboard motor, and extends to a second side in the left-right direction of the outboard motor opposite to the first side.

2. The outboard motor according to claim 1, further comprising an exhaust chamber disposed on the second side in the left-right direction of the outboard motor and connected to the main exhaust passage, wherein an outlet end of the bypass exhaust pipe is connected to the exhaust chamber.

3. An outboard motor comprising:
an engine including a crank case, a cylinder body, and a cylinder head aligned along a front-rear direction of the outboard motor, the crank case and the cylinder body supporting a crankshaft extending along an up-down direction of the outboard motor; and
an exhaust pipe that leads an exhaust gas of the engine to a main exhaust passage positioned below the engine; wherein
the cylinder head includes an exhaust gas outlet opened in a side portion of the cylinder head on a first side in a left-right direction of the outboard motor;
the exhaust pipe includes a bypass exhaust pipe which, in a plan view, extends from the exhaust gas outlet, circumvents the engine alongside the crank case so as to be disposed between the crank case and the frontmost portion of the outboard motor, and extends to a second side in the left-right direction of the outboard motor opposite to the first side; and
the cylinder head is arranged at a rear portion of the outboard motor on an opposite side of the crank case with respect to the front-rear direction of the outboard motor, and the outboard motor further comprises a head cover attached to a rear portion of the cylinder head, and an intake surge tank disposed at a rear portion of the head cover.

4. The outboard motor according to claim 3, wherein the cylinder head includes an intake port opened in a side portion on the second side in the left-right direction of the outboard motor, the outboard motor further comprises an intake pipe curving in the left-right direction of the outboard motor, and the intake surge tank communicates with the intake port via the intake pipe.

5. The outboard motor according to claim 4, wherein the intake pipe curves toward the second side in the left-right direction of the outboard motor.

6. The outboard motor according to claim 1, further comprising a catalyst disposed in the bypass exhaust pipe.

7. The outboard motor according to claim 6, wherein the bypass exhaust pipe includes a nozzle disposed on an upstream side of the catalyst, and the nozzle includes a narrowing portion at which a cross-sectional area of an exhaust passage is gradually reduced toward a downstream side, and an expanding portion at which a cross-sectional area of the exhaust passage gradually increases toward a downstream side between the narrowing portion and the catalyst.

8. The outboard motor according to claim 6, further comprising an air introducing passage connected to an upstream side of the catalyst disposed in the bypass exhaust pipe.

9. An outboard motor comprising:
an engine including a crank case, a cylinder body, and a cylinder head aligned along a front-rear direction of the outboard motor, the crank case and the cylinder body supporting a crankshaft extending along an up-down direction of the outboard motor; and
an exhaust pipe that leads an exhaust gas of the engine to a main exhaust passage positioned below the engine; wherein
the cylinder head includes an exhaust gas outlet opened in a side portion of the cylinder head on a first side in a left-right direction of the outboard motor;
the exhaust pipe includes a bypass exhaust pipe which, in a plan view, extends from the exhaust gas outlet, circumvents the engine alongside the crank case so as to be disposed between the crank case and the frontmost portion of the outboard motor, and extends to a second side in the left-right direction of the outboard motor opposite to the first side; and
the exhaust pipe further includes an exhaust chamber coupled to an outlet end of the bypass exhaust pipe, the exhaust chamber includes a partition inside the exhaust chamber to partition the exhaust chamber into an upstream exhaust gas chamber and a downstream exhaust gas chamber, a communicating hole is provided in the partition and communicates between both the upstream and downstream exhaust gas chambers, and the exhaust chamber further includes an on-off valve that opens and closes the communicating hole.

10. The outboard motor according to claim 1, wherein the engine includes a plurality of cylinders, the cylinder head includes a plurality of the exhaust gas outlets corresponding to the plurality of cylinders, respectively, and the bypass exhaust pipe includes a plurality of exhaust passages which are connected to the plurality of exhaust gas outlets, respectively, and separated from each other.

11. The outboard motor according to claim 10, wherein the plurality of exhaust passages are arranged along horizontal planes at heights of corresponding ones of the plurality of exhaust gas outlets.

12. The outboard motor according to claim 10, wherein the plurality of exhaust gas outlets are located at different heights, and the plurality of exhaust passages are located at different heights corresponding to the heights of the plurality of exhaust gas outlets.

13. An outboard motor comprising:
an engine including a crank case, a cylinder body, and a cylinder head aligned along a front-rear direction of the outboard motor, the crank case and the cylinder body supporting a crankshaft extending along an up-down direction of the outboard motor; and
an exhaust pipe that leads an exhaust gas of the engine to a main exhaust passage positioned below the engine; wherein
the cylinder head includes an exhaust gas outlet opened in a side portion of the cylinder head on a first side in a left-right direction of the outboard motor;
the exhaust pipe includes a bypass exhaust pipe which, in a plan view, extends from the exhaust gas outlet, circumvents the engine alongside the crank case so as to be disposed between the crank case and the frontmost portion of the outboard motor, and extends to a second side in the left-right direction of the outboard motor opposite to the first side;
the engine includes a plurality of cylinders, the cylinder head includes a plurality of the exhaust gas outlets corresponding to the plurality of cylinders, respectively, and the bypass exhaust pipe includes a plurality of exhaust passages which are connected to the plurality of exhaust gas outlets, respectively, and separated from each other; and
the outboard motor further comprises an exhaust chamber disposed on the second side in the left-right direction of the outboard motor, and connected to the main exhaust passage, wherein outlet ends of the plurality of exhaust passages are commonly connected to the exhaust chamber.

14. The outboard motor according to claim 13, wherein the plurality of exhaust passages are separated from each other from the exhaust gas outlets to the exhaust chamber.

15. An outboard motor comprising:
an engine including a crank case, a cylinder body, and a cylinder head aligned along a front-rear direction of the outboard motor, the crank case and the cylinder body supporting a crankshaft extending along an up-down direction of the outboard motor; and
an exhaust pipe that leads an exhaust gas of the engine to a main exhaust passage positioned below the engine; wherein
the cylinder head includes an exhaust gas outlet opened in a side portion of the cylinder head on a first side in a left-right direction of the outboard motor; and
the exhaust pipe includes a bypass exhaust pipe which, in a plan view, extends from the exhaust gas outlet, circumvents the engine alongside the crank case so as to be disposed between the crank case and the frontmost portion of the outboard motor, and extends to a second side in the left-right direction of the outboard motor opposite to the first side;
the engine includes a plurality of cylinders, the cylinder head includes a plurality of the exhaust gas outlets corresponding to the plurality of cylinders, respectively, and the bypass exhaust pipe includes a plurality of exhaust passages which are connected to the plurality of exhaust gas outlets, respectively, and separated from each other; and
the bypass exhaust pipe includes a tubular member that includes a plurality of integrally molded tubular portions corresponding to the plurality of exhaust passages.

16. The outboard motor according to claim 15, wherein the plurality of tubular portions are arranged such that an interval between the tubular portions adjacent to each other is narrowest at a central portion between an inlet end and an outlet end of the tubular member.

17. The outboard motor according to claim 10, further comprising catalysts provided in the plurality of exhaust passages, respectively.

18. The outboard motor according to claim 17, further comprising a plurality of air introducing passages connected to upstream sides of the catalysts in the plurality of exhaust passages.

19. The outboard motor according to claim 10, wherein the plurality of exhaust passages include a plurality of nozzles arranged on upstream sides of the catalysts, respectively, and each of the nozzles has a narrowing portion at which a cross-sectional area of an exhaust passage is gradually reduced toward a downstream side and an expanding portion at which the cross-sectional area of the exhaust passage gradually increases toward the downstream side between the narrowing portion and the catalyst.

* * * * *